US005476119A

United States Patent [19]

Herrmann

[11] Patent Number: 5,476,119

[45] Date of Patent: Dec. 19, 1995

[54] HAND HELD POWER OPERATED SHEARS

[75] Inventor: Raymond J. Herrmann, Westlake, Ohio

[73] Assignee: Bettcher Industries, Inc., Birmingham, Ohio

[21] Appl. No.: 330,184

[22] Filed: Oct. 27, 1994

Related U.S. Application Data

[62] Division of Ser. No. 132,526, Oct. 6, 1993, Pat. No. 5,375, 330.

[51] Int. Cl.$^{6}$ .......... F16K 1/00

[52] U.S. Cl. .......... 137/627.5; 91/455; 137/636

[58] Field of Search .......... 91/455, 457; 137/596.2, 137/627.5, 636

[56] References Cited

U.S. PATENT DOCUMENTS

| | | | |
|---|---|---|---|
| 2,348,612 | 2/1941 | Deacon . | |
| 2,699,756 | 1/1955 | Miller . | |
| 2,743,707 | 5/1956 | Kellersman . | |
| 2,818,643 | 1/1958 | Dawson . | |
| 3,081,790 | 3/1963 | Radford | 137/627.5 X |
| 3,294,120 | 12/1966 | Ruchser | 137/627.5 |
| 3,688,402 | 9/1972 | Shannon . | |
| 3,787,742 | 1/1974 | Murphy . | |
| 3,834,020 | 9/1974 | Caire . | |
| 3,970,110 | 7/1976 | Schaedler et al. . | |
| 4,109,381 | 8/1978 | Pellenc . | |
| 4,206,603 | 6/1980 | Mekler . | |
| 4,359,821 | 11/1982 | Pellenc . | |
| 4,382,331 | 5/1983 | Kimura . | |
| 4,521,963 | 6/1985 | Lind et al. . | |
| 4,587,732 | 5/1986 | Lind et al. . | |
| 4,637,288 | 1/1987 | Olsen et al. . | |
| 4,756,220 | 7/1988 | Olsen et al. . | |
| 4,791,726 | 12/1988 | Ailey, Jr. . | |
| 4,949,461 | 8/1990 | van der Merwe et al. . | |
| 4,967,474 | 11/1990 | Wells . | |
| 5,002,135 | 3/1991 | Pellenc . | |
| 5,150,523 | 9/1992 | McCurry . | |
| 5,172,479 | 12/1992 | Keeton . | |

FOREIGN PATENT DOCUMENTS

| | | |
|---|---|---|
| 9114545 | 10/1991 | WIPO . |

*Primary Examiner*—Robert G. Nilson
*Attorney, Agent, or Firm*—Watts, HOffmann, Fisher & Heinke

[57] ABSTRACT

A servo valve comprises a valve body, an elongated chamber defined by the body and two oppositely facing annular pistons independently movable longitudinally within the body. Each piston has an inner annular first valve seat and an outer annular first obturating surface. A reciprocable valve stem is surrounded by the pistons. Two oppositely facing spaced annular second obturating surfaces are carried by the valve stem a fixed distance apart, with the pistons located between the two second obturating surfaces and reciprocable on the valve stem. Each of the second obturating surfaces is arranged to cooperate with one of the inner annular first valve seats to control fluid flow along the valve stem from a fluid inlet intermediate the pistons. Two annular second valve seats are fixed in the valve body. Each of the annular second valve seats is located to contact the outer annular first obturating surface of one of the two pistons to limit the longitudinal movement of the pistons away from each other and to control fluid flow past the outer annular first obturating surfaces. The pistons each include a surface for transmitting force to the piston in a direction away from the other piston.

6 Claims, 15 Drawing Sheets

E1
E2
B
12
22
24
24A
42
44
150
150A
150B
242
244
246
247
248
249
250
252
254
256
280
282
284
286
287
287A
288
289A
290
290A
292
292A
294
294A

HAND HELD POWER OPERATED SHEARS

This is a divisional of application Ser. No. 08/132,526 filed on Oct. 6, 1993, now U.S. Pat. No. 5,375,330.

BACKGROUND OF THE INVENTION

1. Technical Field

The present invention relates generally to improved power operated shears that are useful for industrial cutting applications. In particular, the improved shears of the present invention are suitable for use in the food processing industry to cut and trim meat, and especially to cut poultry.

2. Description of the Prior Art

Hand held manually operated conventional scissors have been used for cutting and trimming meat and other food products. Conventional scissors also have been used in a variety of other industries for cutting sheet material, such as cloth, textiles or thin metals. It was necessary for an operator of the conventional scissors to use a relatively large cutting effort and often the operator's wrist was at an unnatural orientation. Repetitive use at such orientation and large cutting effort could cause injury to the operator's wrist. To reduce the effort needed to operate such conventional scissors, power operated shears have been devised.

Most known power operated shears have various shortcomings. For example, most such shears do not have a similar physical arrangement to conventional scissors and the blade movement cannot be controlled to the same extent and in the same way as conventional manually powered shears.

Powered cutters for the pruning of plants have been devised that operate similar to manually powered pruning cutters. However, the structures of the powered cutters do not lend themselves to a conventional manually powered scissor type of arrangement which is typically used for cutting meat, poultry, cardboard, heavy cloth and the like, and the powered movement of the blades is not controlled in a manner ideal for scissors having relatively long blades. In such manually powered shears, a thumb ring and a finger loop extend in a direction traverse to the extent of a pair of relatively straight cutting blades. Also, many powered cutters provide a "snap action" cut, in which operation of a trigger causes a blade to close against or across another blade. The speed of closing or the extent of closing, or both, are not controllable by the operator once the closing action begins. Thus, a need exists for power operated or power assisted cutting shears that are arranged, operated and controlled in a manner similar to that of conventional manually-operated scissors.

SUMMARY OF THE INVENTION

The present invention is directed to hand held power operated shears. The power operated shears of the present invention overcome the shortcomings of the known power operated shears mentioned above and others by being closely similar in physical arrangement and operation to that of conventional manually operated scissors. Other operating advantages of the hand held power operated shears of the present invention include a controllable rate of closing of blades and a controllable extent of closing.

The shape and orientation of the blades of the shears of the present invention and the relationship of the handles to the blades is similar to that of conventional scissors. In use, one handle pivots independently of the two blades and the other handle. Relative pivotal movement of the blades is controlled through linkages and a servo mechanism so the operation replicates that of conventional manually powered scissors. During operation of the shears of the present invention, blade movement follows handle movement between relative open and closed positions of the blades.

The attitude of use and physical arrangement of the shears of the present invention is ergonometrically advantageous. In particular, the relative arrangement of the handles and of the blades minimizes deviation from a natural wrist orientation in typical use. The relative handle position and the force multiplier provided by a power actuator helps to relieve overuse injuries. A relative reduction in the amount of handle movement required to close the blades provides a reduction of effort required by an operator which should result in a reduction of overuse injuries. Improved cutting control is provided by changing the force and speed profiles as the blades close. That is, the speed of blade movement is reduced relative to the speed of handle movement as the blades move towards the closed position. Concurrently, the force of closing is increased to compensate for a decrease in mechanical advantage as the blades close.

A fluid power actuator for driving one of the blades for pivotal movement is provided. A control valve regulates the flow of fluid to the power actuator. A safety valve requires the operator's thumb to be in operating position before the shears will operate. The actuator, control valve and safety valve are incorporated in or supported by a compact frame which also acts as a handle. The blades and other handles are supported by the frame and provide a compact, light-weight and well-balanced tool.

Thus, the present invention in its broader aspects is directed to hand held power operated tools, and more particularly shears. Thus, while the invention will be described in connection with the preferred shears, it will be understood that other members for similarly accomplishing a desired task can be arranged and operated in the same or similar manner as the shear blades.

The shears include first and second blades for cutting upon relative pivotal movement from a first open position towards a second closed position. A frame supports the blades for relative pivotal movement about an axis. A first handle and a second relatively pivotable handle are provided. One of the handles is supported for pivoting about an axis independently of the blades. The pivoting handle extends in a direction relative to the axis opposite the second blade. The other of the handles extends in a direction opposite the first blade relative to the axis. An actuator pivots the second blade relative to the first blade to impart a cutting action between blades. A servo mechanism is controlled by movement of the second blade and pivoting handle to control operation of the actuator to pivot the second blade relative to the first blade in coordination with movement of the pivoting handle.

The present invention is more particularly directed to hand held fluid operated shears. The shears include first and second blades and means pivotably connecting the blades for relative pivotal movement about an axis. A thumb receiving handle and a finger receiving handle are included. One of the handles is pivotably supported independently of the blades. The other handle is fixed relative to and extends generally diametrically opposite from the first blade relative to the axis. The pivoted handle extends in an opposite direction and diametrically offset from the second blade relative to the axis when the second blade is in a fully opened position. A fluid actuator is coupled between the fixed handle and the second blade to move the second blade relative to the first blade in coordination with the movement of the pivoted handle. A fluid controlling servo mechanism is controlled by movement of the second blade and the pivoted handle to control operation of the fluid actuator.

The blades are readily replaceable. The blades are supported for relative pivotal movement. One blade has a substantially straight cutting edge and is constructed to be fixed in a supporting frame. The other blade has a substantially straight cutting edge and is constructed to be pivotable relative to the frame. The pivotable blade has an actuating portion extending in an opposite direction from the pivot from a cutting portion of the blade at an obtuse angle in the range of about 120° to 170° relative to a portion of the cutting edge.

The actuating portion has a drive slot that receives a portion of a drive link connected to a piston rod of the fluid actuator. The length and angle of the actuating portion of the pivotable blade and the distance the slot length extends, as well as the location of the pivot, are coordinated with the drive link to allow a size and arrangement of the parts that facilitate locating the parts in the area of the shears that can be accommodated by the palm of the operator's hand. The length and angle of the actuating portion at the same time produces relatively high leverage between the blade and the actuating cylinder over a cutting excursion of 45 degrees of relative pivoting of the blades. The provision of relatively high leverage assures lower reaction forces at the pivot of the blades. Lower reaction forces allow lower structural weight and longer wear life. Relatively high leverage also allows the use of a relatively slim actuating cylinder that can provide adequate force using typical shop air pressures.

The pivotable blade also has a heel portion forming a part of the actuating portion. The heel portion has a ride surface facing an opposed surface of the fixed blade. A part of the opposed surface of the fixed blade projects toward the ride surface of the pivotable blade, biasing the cutting edges of the blades into mutual contact where the cutting edges intersect.

Thus, the invention in its broader aspects is directed to a pair of replaceable blades without handles for shears. The blades have cooperating cutting edges and are suitable for hand held power operated shears. The pair of blades comprises a first blade constructed to be fixed relative to a support and a second blade constructed to be pivoted relative to the support and the first blade at a position on the second blade located between a cutting portion of the blade and an actuating portion of the blade. The cutting and actuating portions of the second blade lie in substantially a common plane. The cutting edge on each blade is generally straight in its extent. The actuating portion of the second blade is shorter than the cutting portion and extends at an obtuse angle relative to the cutting edge. Means on the actuating portion operably couples the second blade with a fluid operated actuator. A heel portion forming a part of the actuating portion of the second blade is substantially aligned with the common plane and has a ride surface facing toward the first blade. A surface on the first blade is opposed to the ride surface. One of the ride surface and the opposed surface has a portion projecting toward the other from the general plane of the respective blade to bias the cutting edge of one blade into mutual contact with the cutting edge of the other blade at a location where the cutting edges intersect.

The fluid actuator operates the pivotable blade through a drive link supported by the frame. In the preferred embodiment the drive link is in the shape of a bell crank. The drive link is supported approximately along a center line of the fixed blade at a distance from the pivot of the movable blade that assures relatively low reaction forces at the pivot and drive points over the full stroke of the fluid actuator. Also the combination of a substantial distance between the blade pivot and the actuator output, and also between the blade pivot and the drive link pivot provides sufficient leverage and stroke to allow a relatively slim actuator operable with typical shop air pressure.

Thus, in its broader aspects, the invention is directed to hand held power operated shears including a drive link which is pivotably supported by the frame at a location along the center line of the first blade. The drive link has a first leg coupled to a movable rod of the actuator. The drive link has a second leg coupled to the second blade for pivoting the second blade upon movement of the rod of the actuator. The drive link has a generally L-shape. The ratio of the first leg to the second leg of the drive link is in the range of 1.15 to 1.85 in order to provide a relatively high leverage mechanical advantage to the pivotal blade.

A servo valve controls flow of pressurized fluid to the fluid actuator to drive the pivotable blade between open and closed positions, replicating movement of the pivoted handle. The servo valve is operated through a linkage coupled to the movable blade and the pivotable handle. The servo valve has two pistons movable on a central valve stem that in turn is movable by the linkage. Valving elements on the pistons, stem and a surrounding housing cooperate to control the supply and exhaust of fluid to the fluid actuator in response to the relative position of the linkage.

In its basic construction, the servo valve of the present invention comprises a valve body, an elongated chamber defined by the body and two oppositely facing annular pistons independently movable longitudinally within the body. Each piston has an inner annular first valve seat and an outer annular first obturating surface. A reciprocable valve stem is surrounded by the pistons. Two oppositely facing spaced annular second obturating surfaces are carried by the valve stem a fixed distance apart, with the pistons located between the two second obturating surfaces and reciprocable on the valve stem. Each of the second obturating surfaces is arranged to cooperate with one of the inner annular first valve seats to control fluid flow along the valve stem from a fluid inlet intermediate the pistons. Two annular second valve seats are fixed in the valve body. Each of the annular second valve seats is located to contact the outer annular first obturating surface of one of the two pistons to limit the longitudinal movement of the pistons away from each other and to control fluid flow past the outer annular first obturating surfaces. The pistons each include a surface for transmitting force to the piston in a direction away from the other piston. A first port to the chamber is located between the pistons and serves as a fluid inlet to the chamber. Second and third ports to the chamber each associated with one of the second valve seats exhaust fluid from the chamber and are closable by the pistons. Fourth and fifth ports to the chamber are located longitudinally outward of the the chamber are located longitudinally outward of the pistons and the second valve seats for supplying fluid to and receiving fluid from the fluid actuator. The distance between the two second obturating surfaces and the distance between the two annular second valve seats allow the pistons to either (a) prevent flow from the first port to any of the other ports when the valve stem is in a first or neutral position, and allow flow through the fourth and fifth ports and only one of the second and third ports when in other than the first position, or (b) alternatively and preferably, to provide restricted flow from the first port equally to the fourth and fifth ports when the valve stem is in a first position, and allow preferential flow through the fourth or fifth port and only one of the second and third ports when in other than the first position. The alternative serves to provide smoother action by pressurizing both sides of the actuating cylinder when the valve stem is in the first or neutral position.

The linkage for operating the servo valve in response to movement of both the pivotable handle and the pivotable blade is comprised of a drive link, a blade link, a difference link and an actuator link. The drive link couples the actuating cylinder to the pivotable blade. The blade link moves with the blade motion and transmits its motion to the difference link. The difference link moves in proportion to the difference between movement of the blade and movement of the pivoted handle. The actuator link transmits movement of the difference link to the servo valve. This movement is roughly proportional to the difference between the position of the pivoting blade and its intended position as determined by the position of the pivoting handle.

The design and construction of the linkage establishes a difference in the blade speed and force as the blades close from an open position. Due to the construction and arrangement of the difference link, the blade speed diminishes progressively with respect to the pivoted handle speed as the pivoted blade closes (i.e., as the blade angle diminishes with respect to the fixed blade). Preferably the ratio of blade movement to trigger movement changes from a ratio of 5 to 1 or more when the blades are open, to a ratio of 2 to 1 or less when the blades are substantially closed. The linkage controls the movement of the pivotable blade through a greater angle than the pivoted handle moves, thereby reducing the distance through which the operator's hand must move to accomplish any cutting action as compared to a conventional manually powered scissors.

Thus, in its broader aspects, the invention provides a servo mechanism including a linkage that moves a pivoted blade of a hand held fluid operated shears in coordination with the movement of an independently pivoted handle but at a rate relative to a fixed blade that decreases in response to movement of the handle as the blade moves from an open position to a closed position. The invention further provides a decreasing rate of blade movement relative to handle position as the blade moves from an open position to a closed position. The invention further provides a fluid operated servo mechanism that moves a pivoted blade through a greater angle than a controlling handle is moved.

Operation of the shears is prevented in the absence of being properly gripped by an operator with the thumb of the operating hand engaged in the fixed handle of the shears. This is accomplished through a safety valve supported in the frame of the tool, the valve being normally closed and preventing flow of operating fluid to the actuating cylinder. A valve-operating lever extends from the valve into a thumb-receiving opening of the fixed handle and is pivoted by the thumb, when the thumb is fully received in the opening, to a position that opens the safety valve. The safety valve also serves to spring bias the lever into the thumb-receiving opening when the safety valve is closed.

Thus, in its broader aspects, the invention provides hand held fluid operated shears comprising first and second blades, means pivotably connecting the blades for relative pivotal movement, a thumb-receiving handle, a finger-operated handle, one of said handles being supported for pivoting independently of the blades and one being fixed relative to the first blade, the handle supported for pivoting being pivotable independently of either blade toward and away from the other handle, a fluid actuator acting between the fixed handle and the second blade, a safety valve for selectively permitting or interrupting flow of fluid that operates the fluid actuator, and a safety valve control having a portion movable between a first position where it extends into a thumb-receiving opening of the thumb-receiving handle and interrupts said flow, and a second position where it is moved out of said opening when an operator's thumb is received in the opening and allows said flow. Preferably the shears include a housing integral with the thumb-receiving handle and the safety valve is located within the housing.

BRIEF DESCRIPTION OF THE DRAWINGS

Further features of the present invention will become apparent to those skilled in the art to which the present invention relates from reading the following specification with reference to the accompanying drawings, in which.

DETAILED DESCRIPTION OF A PREFERRED EMBODIMENT

Overview

Figure 1:
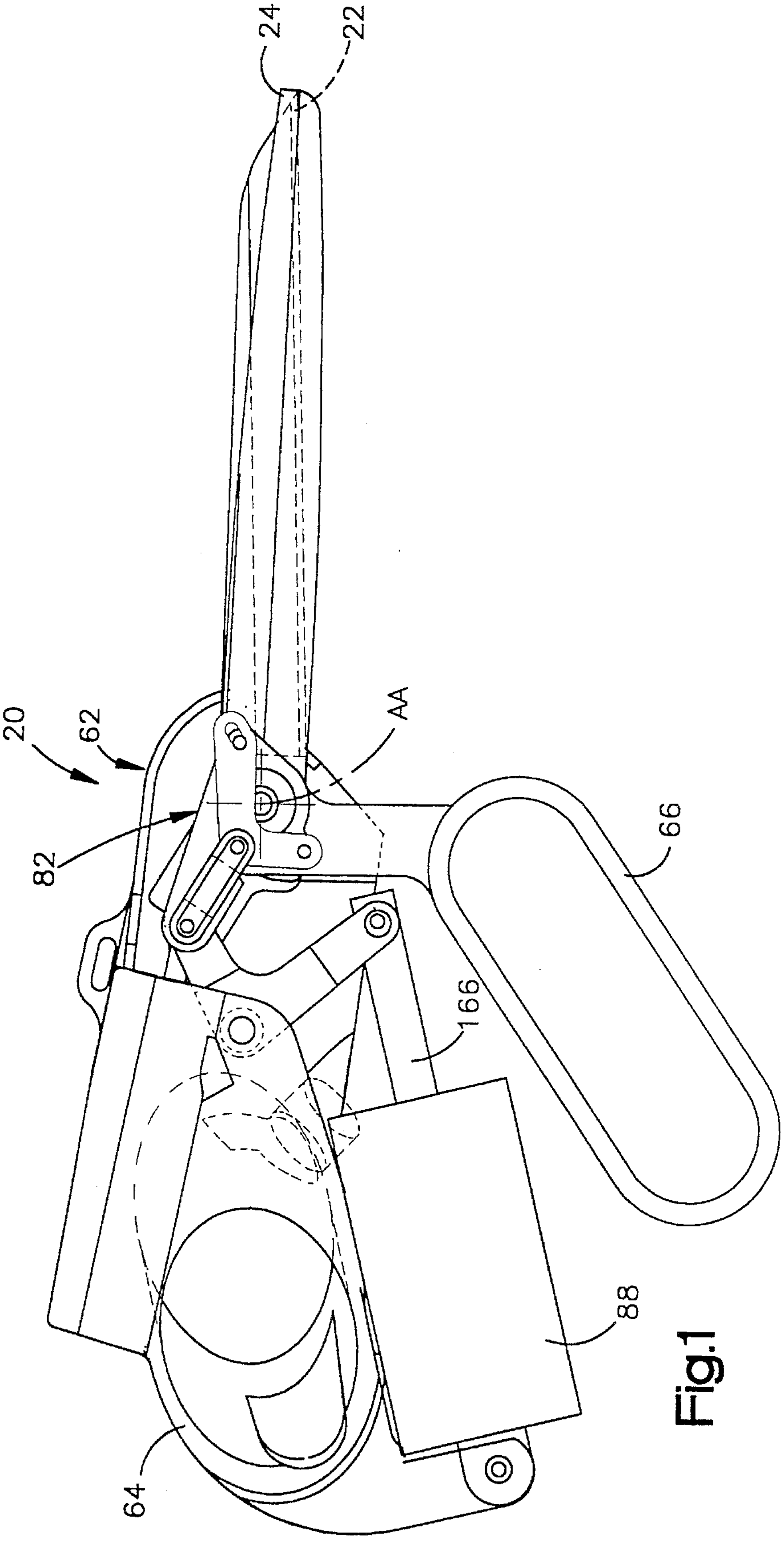
FIG. 1 is a plan view of hand held power operated shears embodying the present invention with the handles and blades in fully closed relative positions.

Hand held power operated shears 20, embodying the present invention, are illustrated in FIG. 1. The shears 20 include a pivotable blade 22 which is reciprocable relative to another blade 24 between the fully open position illustrated in FIG. 2 and the fully closed position illustrated in FIG. 1. A cutting or shearing action is provided between the cutting edges 42, 44 (FIG. 2) of the blades 22, 24, respectively, during movement of the pivotable blade 22 relative to the blade 24 from the open position towards the closed position. An advantage of the present invention is that the shears 20 appear, and operate in a manner, very similar to conventional manually powered scissors. This conventional type of operation is advantageous because little or no training or adaptation to the power operated shears 20 is required.

The blades 22, 24 are supported in a frame 62 about an axis AA. The frame 62 supports the blade 24 in a fixed relative position. The blade 22 is pivotable relative to the frame 62 and relative to the fixed blade 24 about the axis AA. A thumb handle portion 64 is formed in the frame 62 for receiving an operator's thumb to support and control the shears 20. A finger loop handle 66 is supported in the frame 62 for pivotal movement. Thus, the blades 22, 24 and the finger loop handle 66 are all supported in the frame 62 along the axis AA. In response to pivotal movement of the handle 66 relative to the frame 62 and thumb handle portion 64, the blade 22 is power driven to pivot relative to the blade 24.

The frame 62 also supports a servo mechanism 82 (FIGS. 1–5) for controlling the power applied to pivot the blade 22. The servo mechanism 82 includes a servo control valve 84 (FIG. 3) and a safety valve 86, an actuator 88, a drive link 102, and a feedback linkage 104. The drive link 102 transmits power from the actuator 88 to the pivotable blade 22. The feedback linkage 104 determines the difference between the position of the finger loop handle 66 relative to the frame 62 and the position of the pivotal blade 22 relative to the frame. The feedback linkage 104 communicates the difference between the position of the blade 22 and the position of the loop handle 66 to the servo control valve 84. The control valve 84 selectively permits or inhibits the flow of a power medium to the actuator 88. The power is preferably provided by a fluid, such as pressurized air. However, it will be apparent that hydraulic or electrical power assist can be used.

Construction

Figure 6:
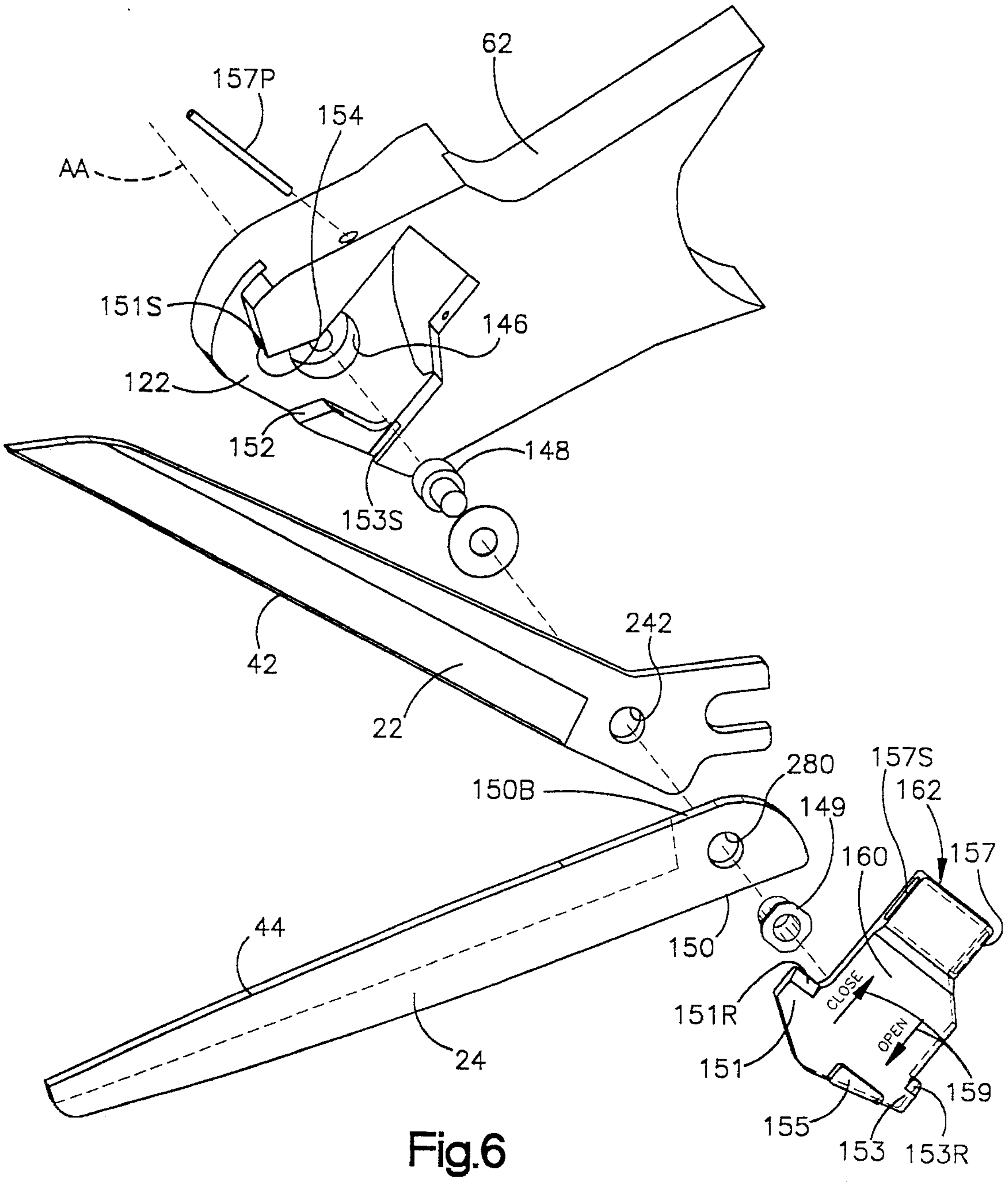
FIG. 6 is an exploded perspective view of a portion of the shears in FIG. 1 illustrating the frame and the blades.
Figure 8:
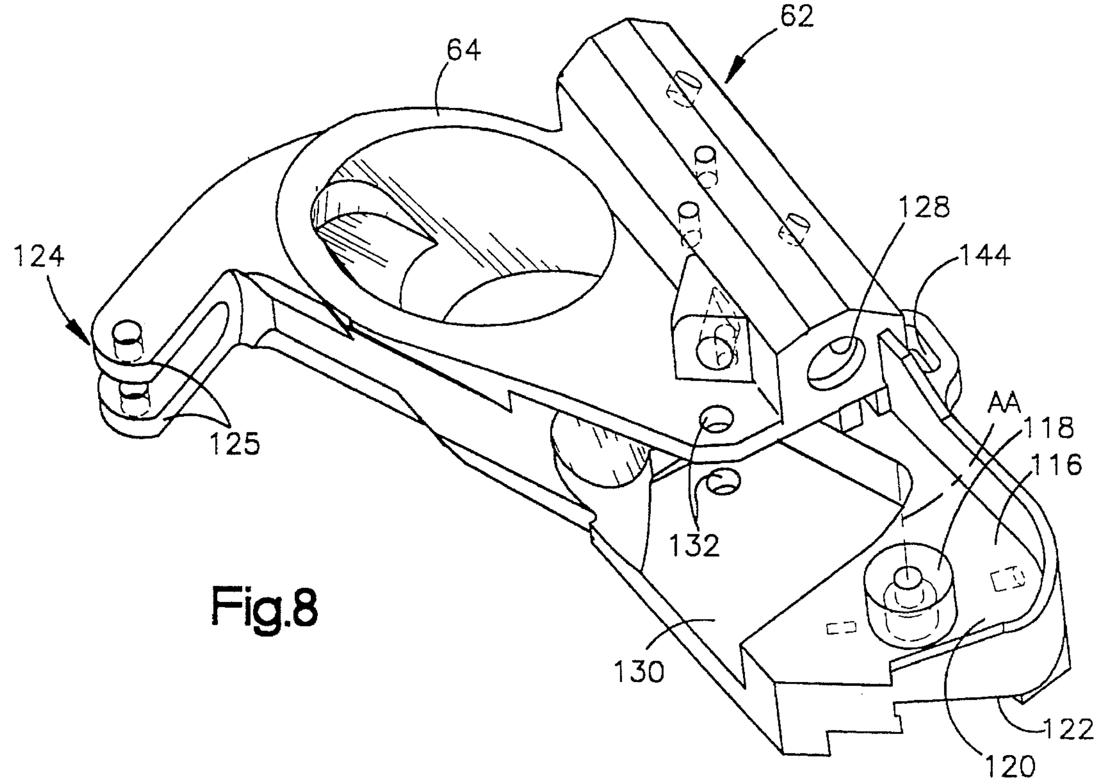
FIG. 8 is an enlarged perspective view of the frame and handle of the shears.
Figure 9:
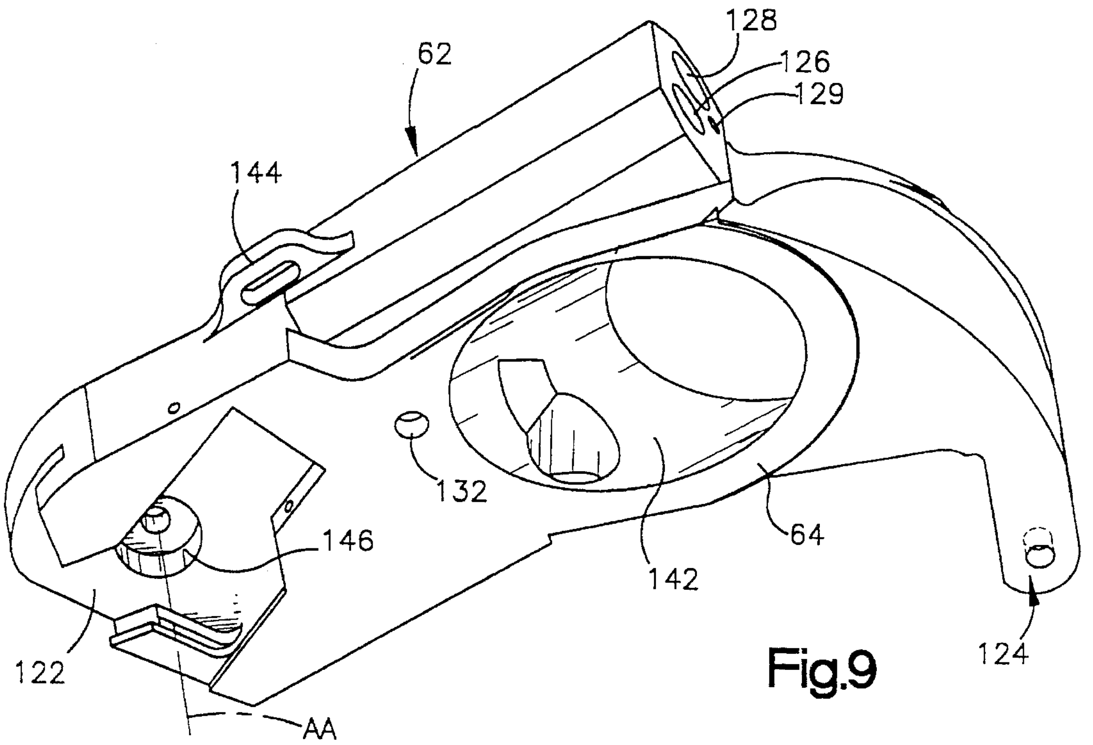
FIG. 9 is an enlarged perspective view of the frame and handle in FIG. 8 viewed from another direction.

The frame 62 (FIGS. 8 and 9) supports all of the parts of the shears 20. The thumb handle portion 64 is integrally formed in the frame 62 for receiving an operator's thumb. The frame 62 also includes a recess 120 (FIG. 8), a recess 122 (FIGS. 6 and 9), exhaust port 129 (FIG. 9), a cylinder support 124 (FIGS. 8 and 9), valve chambers 126, 128 (FIG. 9), a safety lever opening 142 and an attachment hook 144. The attachment hook 144 permits the frame 62 and shears 20 to be connected during use to a weight compensating device, such as a constant force spring.

Figure 2:
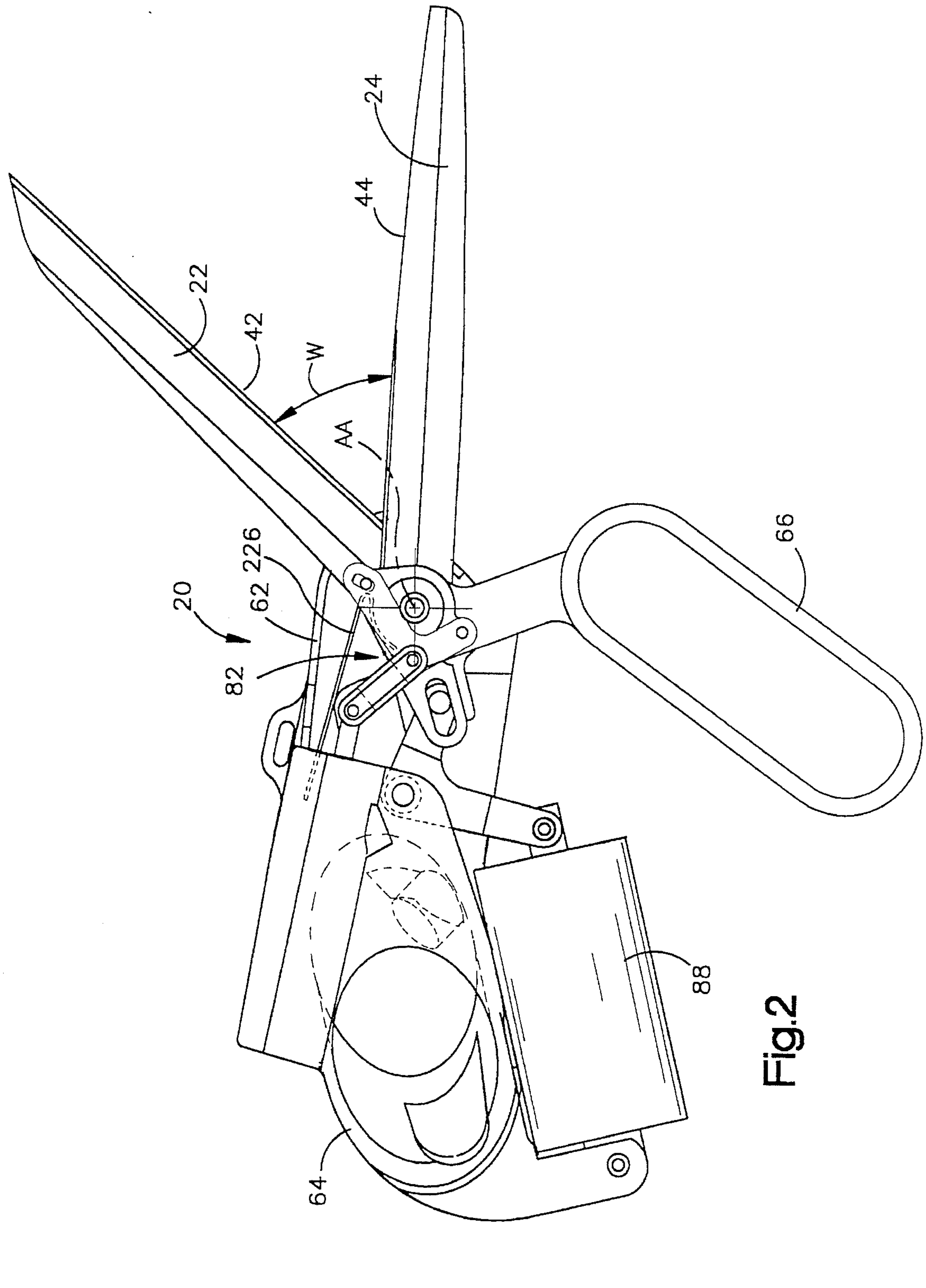
FIG. 2 is a view similar to FIG. 1 with parts in fully open relative positions.

The recess 120 (FIG. 8) in the frame 62 receives the feedback linkage 104 and a pivot portion of the finger loop handle 66. A support 118 is integrally formed on the frame 62 and projects generally perpendicular from a side surface 116 defining a portion of the recess 120. The support 118 is received in an opening 119 (FIG. 14) in the pivot portion of the finger loop handle 66 in a close fit relationship for pivotal movement about the axis AA. The recess 120 is left uncovered during operation of the shears 20 to enable viewing of the feedback linkage 104 and loop handle 66. The uncovered recess 120 allows easy removal of any debris that may enter the recess and contact the feedback linkage 104 or pivot portion of the finger loop handle 66. A return spring 226 (FIG. 14) is located within the recess 120 and engages both the finger loop handle 66 and the frame 62. The return spring 226 continually biases the loop handle 66 towards a fully open position, as illustrated in FIG. 2.

A recess portion 130 (FIG. 8) defines a space which is in communication with the recess 120 and the recess 122 to permit interaction between the blades 22, 24; the finger loop handle 66; the servo mechanism 82 and the feedback linkage 104. The recess portion 130 is located between the recess 120 and thumb handle portion 64. The recess 130 receives the drive link 102 (FIGS. 4 and 5) therein. The drive link 102 is supported for pivotal movement within the recess portion 130 at openings 132 by a pin 134 extending through the opening. The drive link 102 (FIGS. 4 and 5) connects the actuator with the pivotable blade 22. The drive link 102 forces the blade 22 to pivot relative to the frame 62 and relative to the fixed blade 24 in response to movement of a part in the actuator 88.

The recess 122 in the frame 62 receives the blades 22, 24. A cavity 146 (FIGS. 6 and 9) within the recess 122 extends coaxially inside of the support 118 which projects to the recess 120 from the surface 116. The opening 146 receives a support member 148 on which the blades 22, 24 are supported. The blade 22 is closely fit about the support member 148 for pivotal movement about the axis AA. The blade 24 is also closely fit on the support member 148. The blade 24 is fixed relative to the frame 62 by a surface 150 of the blade that engages surfaces 152, 154 of the recess 122, which prevents movement of the blade relative to the frame 62. The surfaces 152, 154 in the recess 122 are located on diametrically opposite sides of the blade 24 relative to the axis AA to engage the surfaces 150 and 150B of the fixed blade 24 in connection with the support member 148 to accommodate reaction forces acting on the blade 24. The blades 22, 24 are illustrated in the fully open position in FIG. 2. The pivotable blade 22 is disposed at an acute angle W of about 40° to 45° relative to the fixed blade 24. This angle W, however, can be predetermined and varied for specific job requirements, such as by using a different servo mechanism 82, blade 22 or frame 62.

Figure 7:
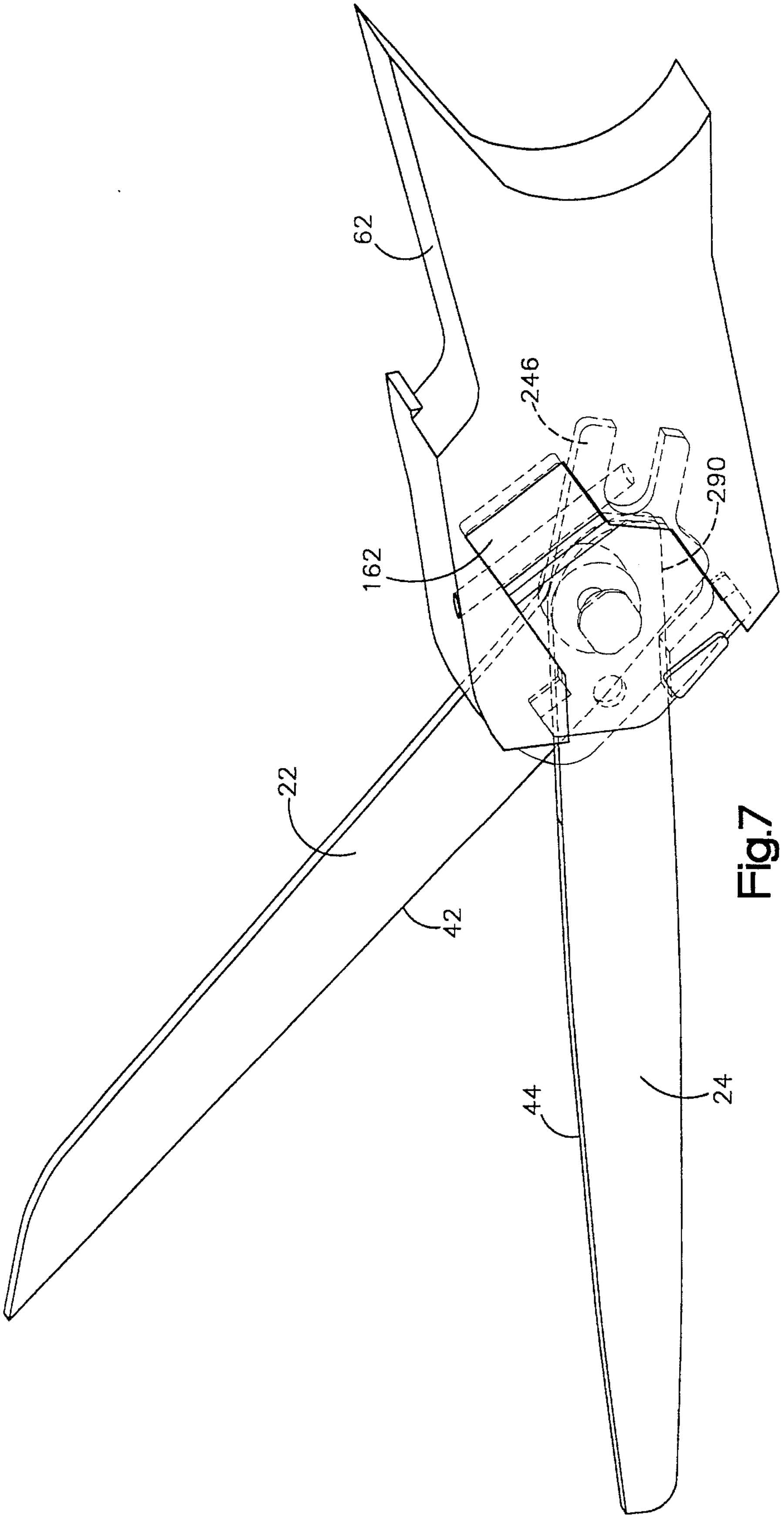
FIG. 7 is a perspective view of the portion of the shears in FIG. 6 with the parts assembled.

The recess 122 is closed by a latch cover plate 162 (FIGS. 6 and 7), after the blades 22, 24 are received therein. The frame 62 and latch cover plate 162 protect the blades 22, 24 from debris entering the recess 122. The latch cover plate 162 includes a body portion 160 for closing the recess 122 and for preventing the blades 22, 24 and support member 148 from movement laterally outwardly of the recess in a direction along the axis AA.

The latch cover plate 162 is movable relative to the frame 62 in the directions indicated by arrows 159 (FIG. 6) formed on the exterior of the latch cover plate to permit access to the blades 22, 24. A connecting portion 157 extends from the body portion 160 to pivotably and slidably attach the latch cover plate 162 to the frame 62. The connecting portion 157 has a slot 157S formed therein for receiving a pin 157P. The slot 157S allows the latch plate cover 162 to slide as well as pivot relative to the pin 157P. The slot 157S has an hourglass shape across its width so the walls defining the slot are flexible to urge the latch plate cover 162 in one of two directions it can slide to tend to retain the latch plate cover in a closed or open position. The latch cover plate 162 is free to pivot outwardly of the frame 62 when the latch cover plate is axially moved to an open position as indicated by open arrow 159, by virtue of freeing retaining tabs 151, 153 from their respective receiving slots 151S, 153S.

A finger grip 155 is provided on a body portion 160 to move the latch cover plate 162 to an open position permitting access to the recess 122 and blades 22, 24. Each retaining tab 151, 153 includes a ramp 151R, 153R which is received in a respective slot 151S, 153S in the frame 62. The ramps 151R, 153R are tapered to permit relatively easy insertion of the tabs 151, 153 into a slot 151S, 153S and to force the latch cover plate 162 inwardly towards the recess 122 in a direction along the axis AA. This assures that the inwardly facing surface of the latch cover plate 162 engages a bushing 149 on the support member 148 to prevent lateral movement of the blades 22, 24 and support member 148 from the recess 122.

The actuator support 124 (FIG. 8) extends from the frame 62 and includes a pair of fingers 125 spaced apart forming a clevis. The actuator support 124 pivotably receives a mounting portion 164 (FIG. 3) of the actuator 88 between the fingers 125. Thus, the actuator 88 is pivotably fixed to the frame 62 at one end. The actuator 88 includes a rod 166 (FIG. 14) extending therefrom in a direction opposite to the mounting portion 164.

The rod 166 is fixed to a piston 168 (FIG. 17A) for reciprocal movement within a cylindrical chamber 182 in the actuator 88. The piston 168 divides the chamber 182 into a variable volume "open" chamber 184 and a variable volume "cut" chamber 188. When fluid flow under pressure is directed into the open chamber 184 through port 186 and fluid is permitted to exhaust from cut chamber 188, the greater pressure within the open chamber forces the piston 168 and rod 166 to move axially to the right in a blade open direction, as viewed in FIG. 17A. The rod 166 moving in a blade open direction, moves the blade 24, through the drive link 102, in a direction towards the fully open position, as illustrated in FIG. 2. When fluid pressure is directed into the "cut" chamber 188 through port 190, and fluid exhausts from the cut chamber 184, the piston 168 and rod 166 are forced to move to the left in a blade cut direction, as viewed in FIG. 17A. The rod 166 moving in a blade cut direction moves the blade 24, through the drive link 102, towards the fully closed position, as illustrated in FIG. 1. The actuator 88 is located relative to the frame 62 and sized to fit comfortably within the palm of a hand of an operator of the shears 20. The actuator 88 provides sufficient force to cut items, such as chicken bones.

Figure 3:
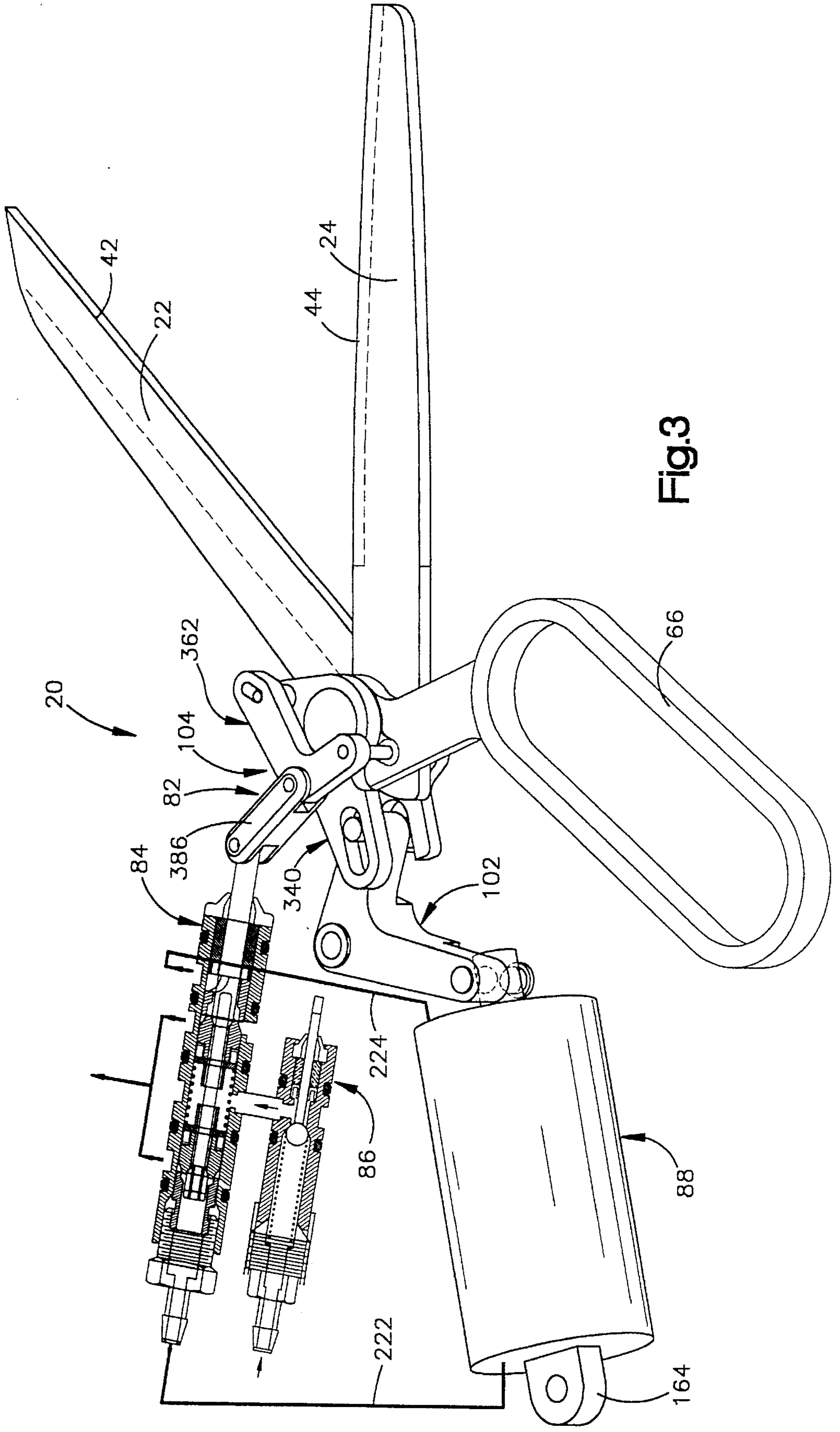
FIG. 3 is a partial perspective view of the shears in FIG. 1 with parts removed for clarity illustrating the major movable parts.
Figure 4:
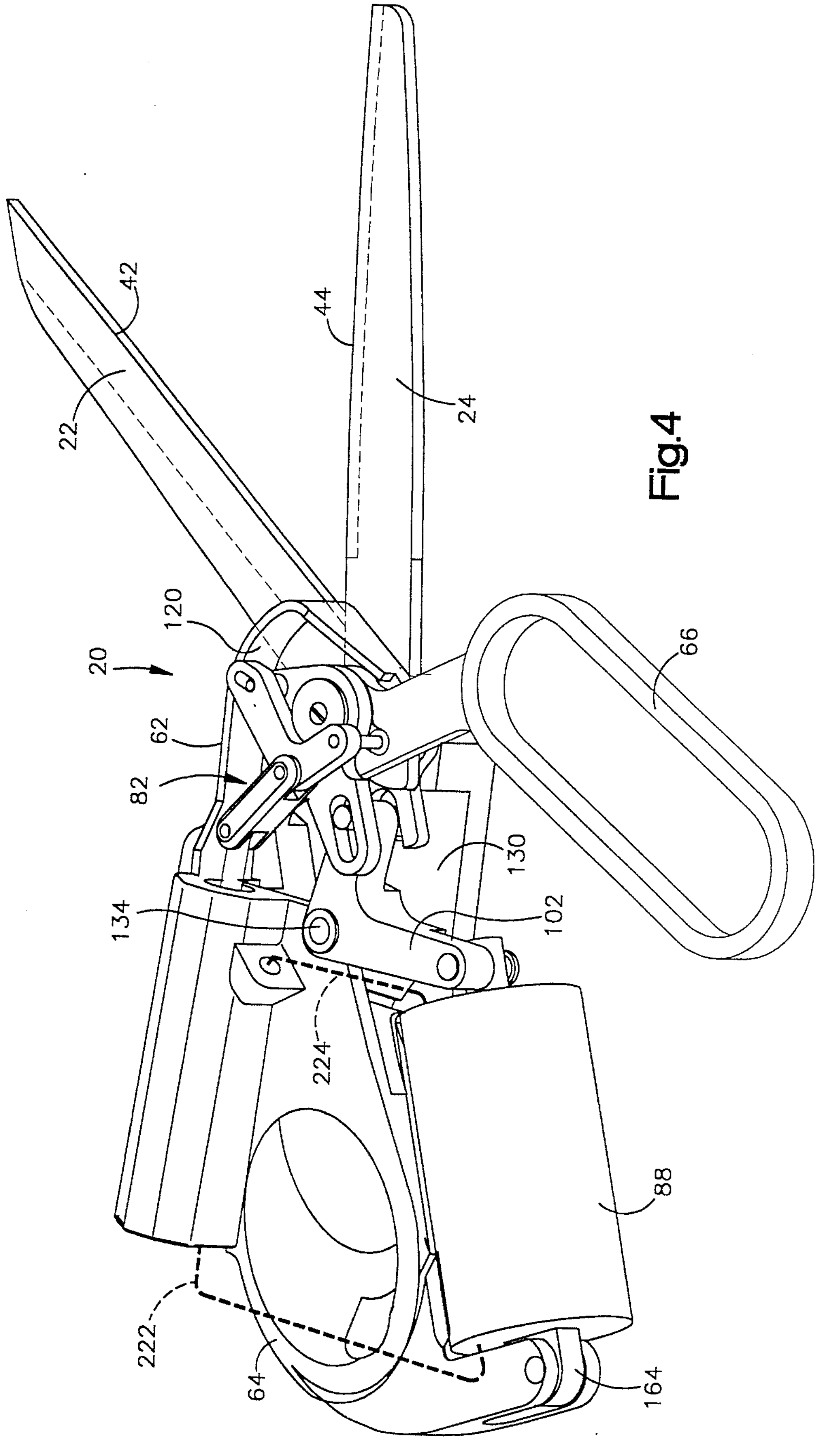
FIG. 4 is a view similar to FIG. 3 illustrating relative positions of some parts of the shears.
Figure 5:
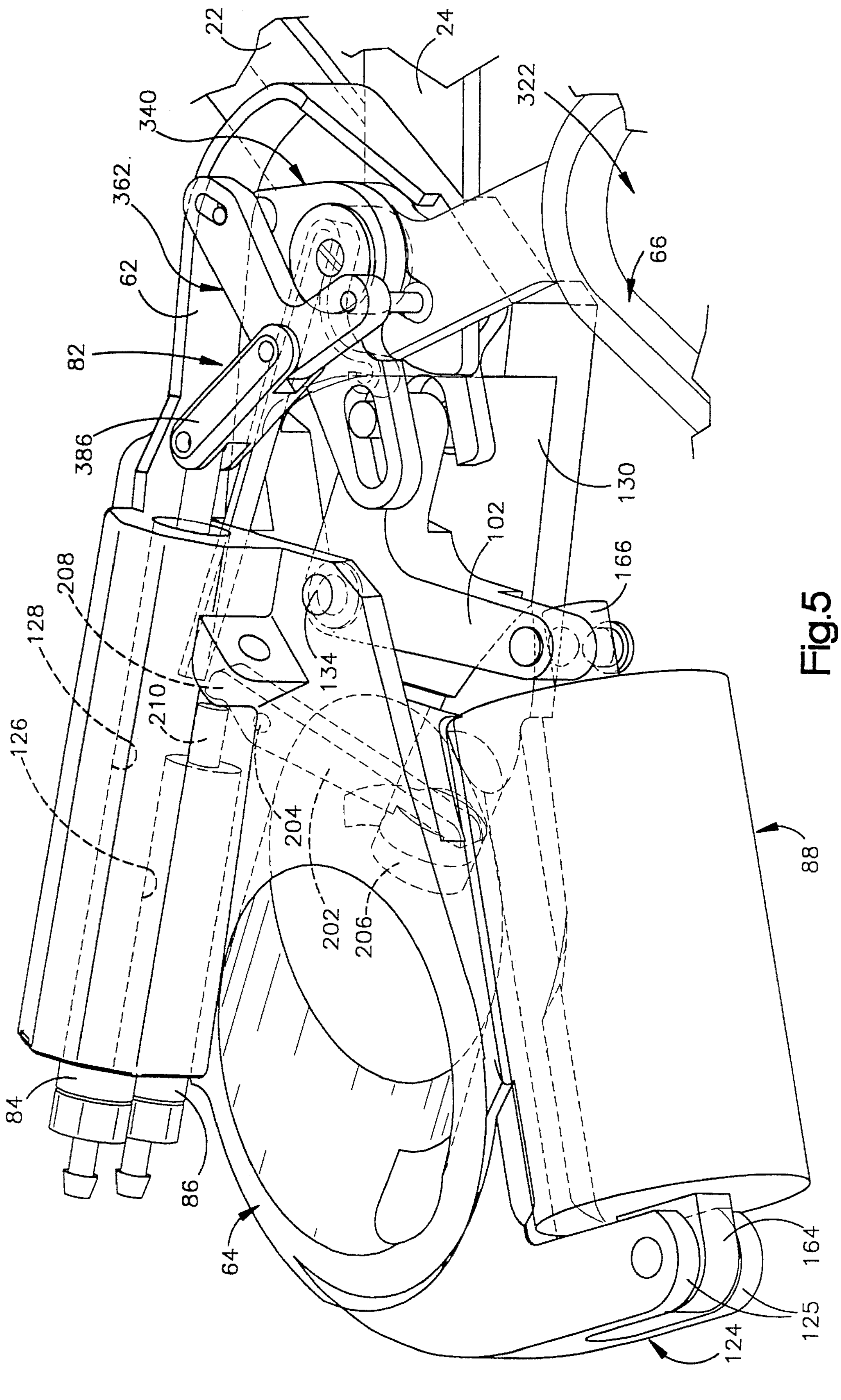
FIG. 5 is an enlarged perspective view of a frame and handle portion of the shears in FIG. 1.
Figure 17A:
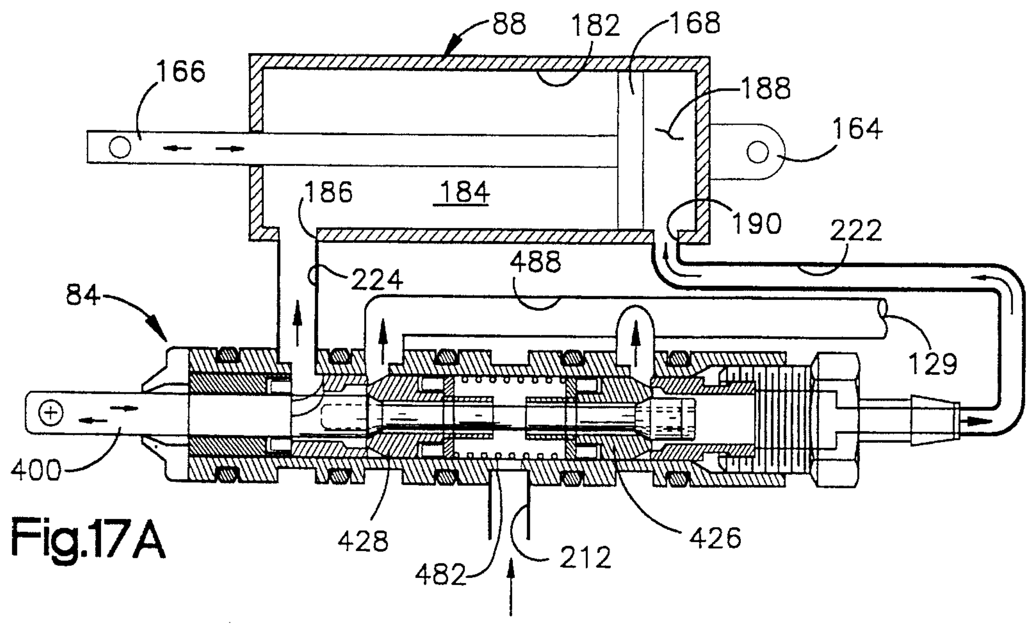
FIGS. 17A–H are schematic longitudinal cross-sectional views of the servo control valve in FIG. 16 illustrated with parts illustrated in different operating positions.

The servo control valve 84, (FIGS. 3, 16 and 17A–H) is received in the valve chamber 128 which extends completely through the frame 62. The servo control valve 84 is operably coupled to the actuator 88 by fluid conducting lines 222, 224 (FIGS. 3, 4 and 17A). The lines 222, 224 may be located internal or external of the frame 62. Preferably, the lines 222, 224 are external with the line 222 fitting in a groove in the thumb handle portion 64 facing away from the blades 22, 24. The safety valve 86 is received in the valve chamber 129 which extends only partially through the frame 62.

A safety lever 202 (FIG. 5) is pivotably supported in the thumb handle portion 64 of the frame 62 about a pin 204. A button 206, at the end of one relatively long leg portion of the safety lever 202, extends into the thumb opening 142 of the thumb handle portion 64 under bias of the safety valve 86. When an operator inserts a thumb into the thumb opening 142, the button 206 is depressed and the lever 202 pivots about the pin 204.

A relatively short end portion 208 of the lever 202 moves a rod 210 (FIGS. 5 and 16) in the safety valve 86 to a position permitting fluid pressure from a fluid inlet 211 to the servo control valve 84 through a passage 212. When the button 206 is not depressed, a check valve 216 in the safety valve 86 is biased by a spring 217 to block the flow of pressurized fluid to the passage 212 and the servo control valve 84. This assures that fluid pressure is applied to the actuator 88 to move the blade 24 only when an operator has a thumb in the thumb opening 142 in the thumb handle portion 64 of the frame and can control the shears 20.

A cutting or shearing action is effected during closure of the blade 24 relative to the blade 22 from the position illustrated in FIG. 2 to the position illustrated in FIG. 1. The blade 22 is pivotable relative to the frame 62 about the member 148 and the axis AA. The blade 22 is pivotable in response to movement of the loop handle 66 relative to the frame 62. When the shears 20 are in the fully closed position, as illustrated in FIG. 1, the blades 22, 24 overlie one another in a side-by-side engaged relationship.

Figures 10, 11, 11A, 12, 13, 13A:
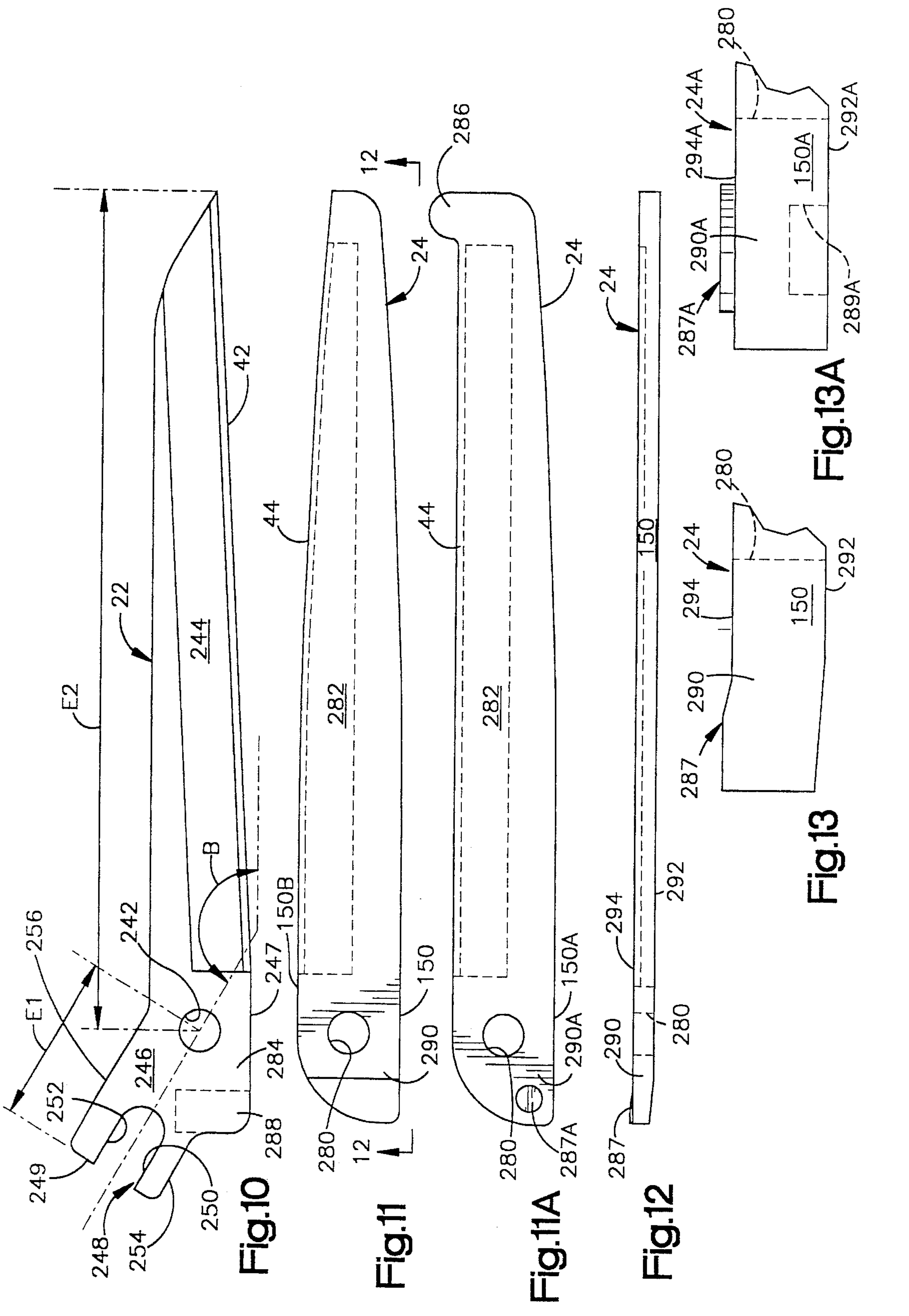
FIG. 10 is a plan view of one replaceable blade of the shears.
FIG. 11 is a plan view of another replaceable blade of the shears.
FIG. 11*a* is a plan view of an alternate embodiment of the blade illustrated in FIG. 11.
FIG. 12 is a side view of the blade illustrated in FIG. 11 taken along the line 12—12 in FIG. 11.
FIG. 13 is an enlarged view of an axial end portion of the blade in FIG. 12.
FIG. 13*a* is a view similar to FIG. 13 illustrating an alternate axial end portion of the blade.

The pivotable blade 22 is illustrated in FIG. 10 in detail. The pivotable blade 22 includes an opening 242 extending through the blade and sized to closely fit over the member 149. The pivotable blade 22 includes a relatively long cutting portion 244 extending from the opening 242 and having the cutting edge 42 formed thereon. The pivotable blade 22 includes an actuating portion 246 extending from the opening 242 in a direction away from the cutting portion 244, at an obtuse angle B relative to a straight unground edge portion 247 located directly below the opening 242 and contiguous with the cutting edge 42. The obtuse angle B is in the range of 120° to 170°, and is preferably 145°.

The extent E1 of the actuating portion 246 from the center of the opening 242 is less than the extent E2 of the cutting portion 244 from the center of the opening. The ratio of the extent E2 of the cutting portion 244 to the extent E1 of the actuating portion 246 is in the range of between one to one (1:1) to ten to one (10:1), and preferably is 4.9:1. The extent E2 of the cutting portion 244 is preferably 5 inches from the center of the opening 242 to the tip of the blade. The extent E1 is preferably 1.020 inches from the center of the opening 242 to an end surface 249 of the actuating portion.

The pivotable blade 22 is preferably formed from a suitable metal, such as stainless steel. The cutting edge 42 is formed in the blade 22 by a suitable operation such as by grinding and/or polishing. Preferably, the cutting edge 42 is substantially straight. However, it will be apparent that the cutting edge 42 may be formed into any suitable shape necessary to perform a desired cutting function, such as a straight portion and a curved tip end portion with a relatively large radius.

The actuating portion 246 of the blade 22 includes an elongated slot 248 opening through the end surface 249 and extending in a direction toward the opening 242. The slot 248 is defined by two parallel side surfaces 250, 252 extending in a direction substantially parallel to a line extending from the center of the opening 242 at an angle of 145° relative to the unground edge portion 247. The actuating portion 246 also has a pair of substantially parallel extending surfaces 254, 256 extending in a direction parallel to the slot 248 defining side surfaces 250, 252 of the actuating portion. The slot 248 accepts a driving member 258 (FIGS. 14 and 15) of the drive link 102 to force the blade 22 to pivot relative to the fixed blade 24 upon pivoting of the drive link. A heel 284 is located on the actuating portion 246 opposite the opening 242 from the cutting portion 244. The heel 284 includes a ride surface 288 on the blade 22.

The fixed blade 24 is illustrated in detail in FIGS. 11–13. The fixed blade 24 includes an opening 280, a cutting portion 282 and a mounting end 290. The opening 280 is formed to closely receive a portion of the support member 148 and 149. The support member 148, blade surfaces 150 and 150B and frame surfaces 152, 154 cooperate to prevent movement of the blade 24 relative to the frame 62. The cutting edge 44 of the fixed blade 24 is formed in the cutting portion 282 by grinding and/or polishing. The cutting edge 44 has a straight portion adjacent the mounting end 290 and a distal end portion having a slight curvature; for example, a radius in the range of 100–200 inches. The cutting portions 244, 282 of the respective blades 22, 24 are slightly bowed away from one another between their tips and respective openings 242, 280. An alternative fixed blade 24A (FIG. 11A) includes a ball tip 286 at the end of cutting portion 282A, which aids in eviscerating animal carcasses.

The mounting end 290 (FIGS. 12 and 13) of the fixed blade 24 is located relative to the opening 280 diametrically opposite to the cutting portion 282. The mounting end 290 has a portion 287 bent upwardly, as viewed in FIGS. 12 and 13, during manufacture of the blade 24 away from a lower side surface 292 of the blade, as viewed in FIGS. 12 and 13. This deformed portion 287 of the mounting end 290 assures that the bent portion 287 extends in a direction parallel to the upper side surface 294, but offset. The bent portion 287 of mounting end portion 290 preferably extends 0.010 inch from the upper side surface 294 of the blade 24. The bent portion 287 of mounting end 290 is preferably ground flat after the deforming operation in order to form a surface generally parallel with the upper side surface 294 of the blade 24.

An alternate mounting end 290A (FIG. 13A) of the fixed blade 24A (FIG. 11A) is located relative to the opening 280 diametrically opposite to the cutting portion 282. The mounting end 290A has a portion 287A deformed upwardly, as viewed in FIG. 13A, during manufacture of the blade 24A away from a upper side surface 294 of the blade, as viewed in FIG. 13. This deformed portion 287A of the mounting end 290A is formed by engaging a lower side surface 292A extending in a direction parallel to the upper side surface 294A with a punch to form recess 289. The deformed portion 287A of mounting end portion 290A is forced by the punch and preferably extends 0.010 inch from the upper side surface 294A of the blade 24A. The deformed portion 2897A of mounting end 290A is preferably ground flat after the deforming operation in order to form a surface generally parallel with the upper side surface 294A of the blade 24A.

The cutting edges 42, 44 are adapted to face one another when the blades are properly installed in the frame 62. When the blades 22,24 are relatively pivoted towards one another, the deformed portion 287 of the mounting end 290 of the fixed blade 4 engages the ride surface 288 in the heel 284 of the pivotable blade 22. The engagement between the deformed portion 287 and the ride surface 288 assures that the cutting edges 42, 44 are continuously biased towards one another to contact and to create a moving cutting point during closure of the blade 22 relative to the blade 24.

Figure 14:
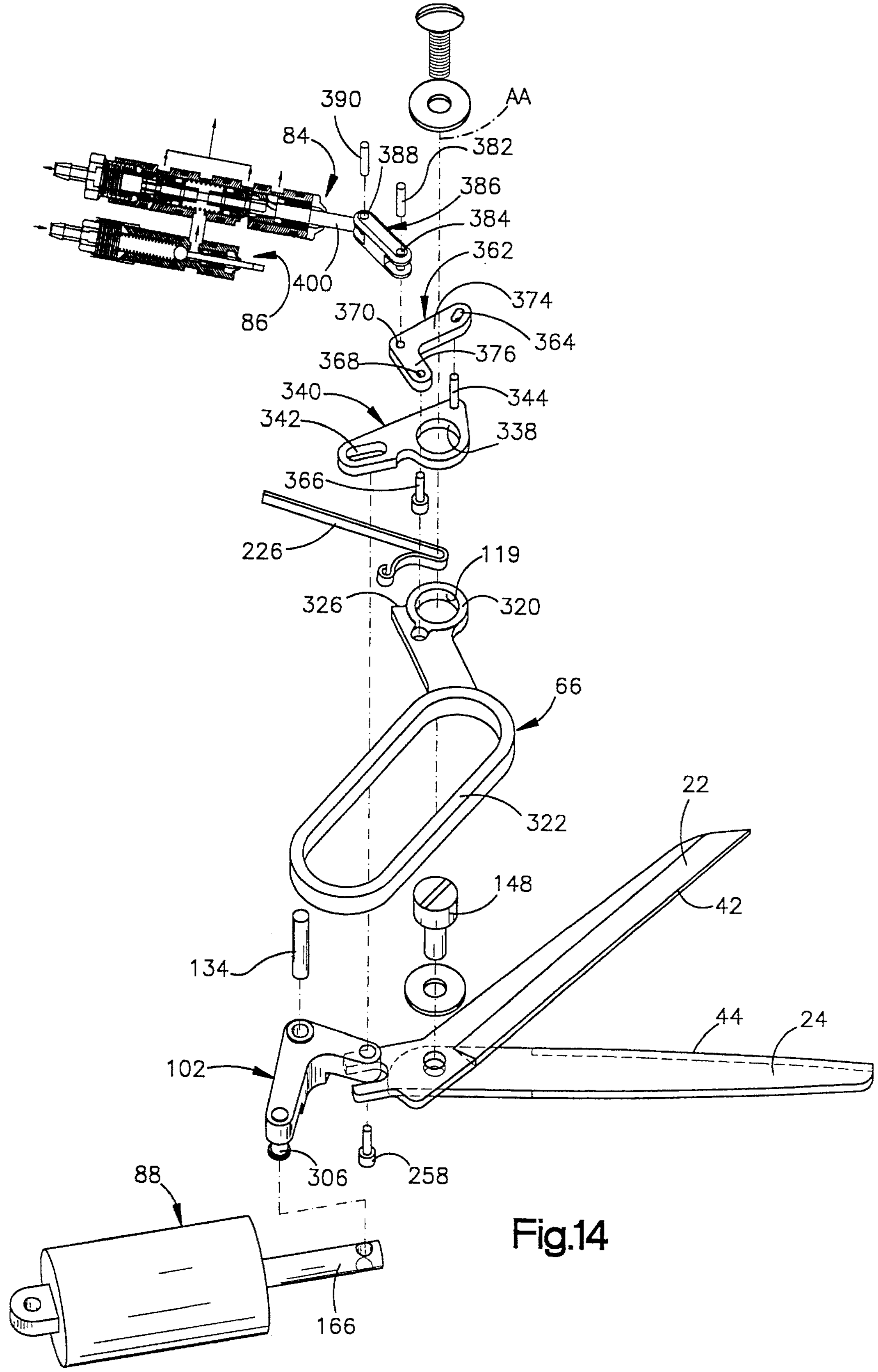
FIG. 14 is an exploded perspective view of the major movable parts of the shears in FIG. 1.
Figure 15:
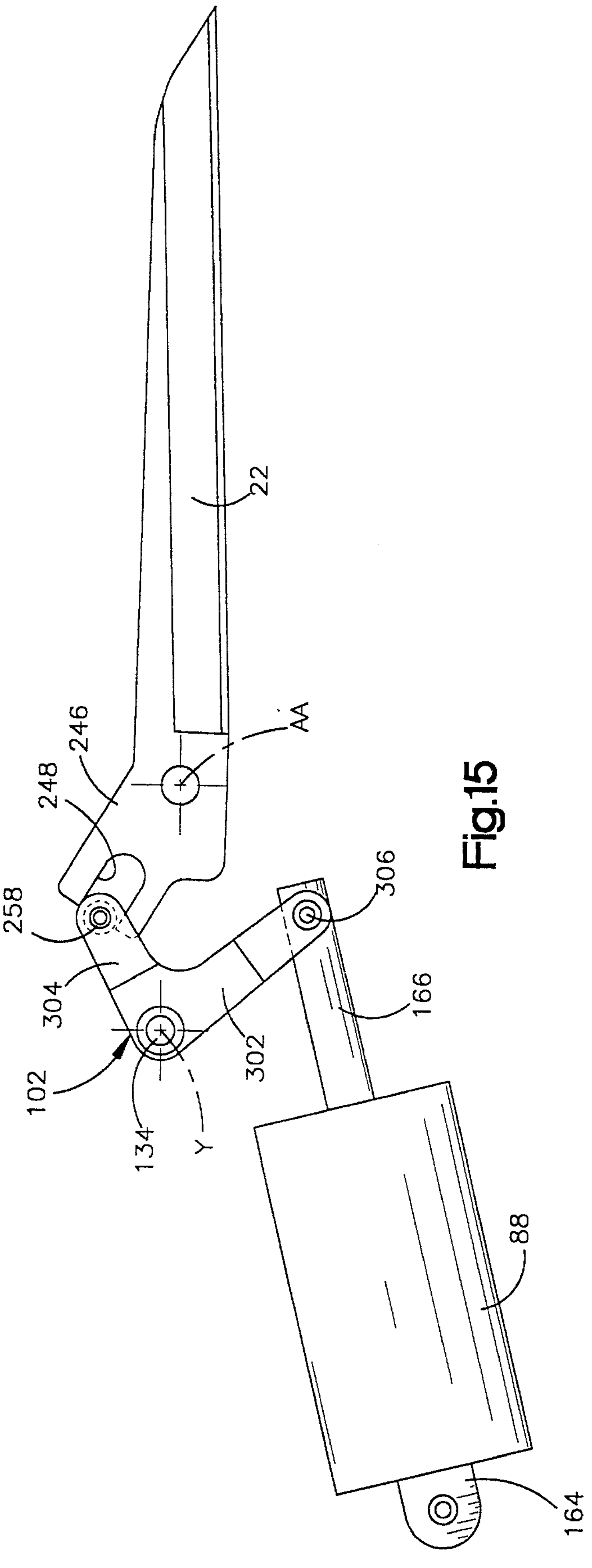
FIG. 15 is a plan view of a fluid power actuator, drive link and blade of the shears.
Figure 16:
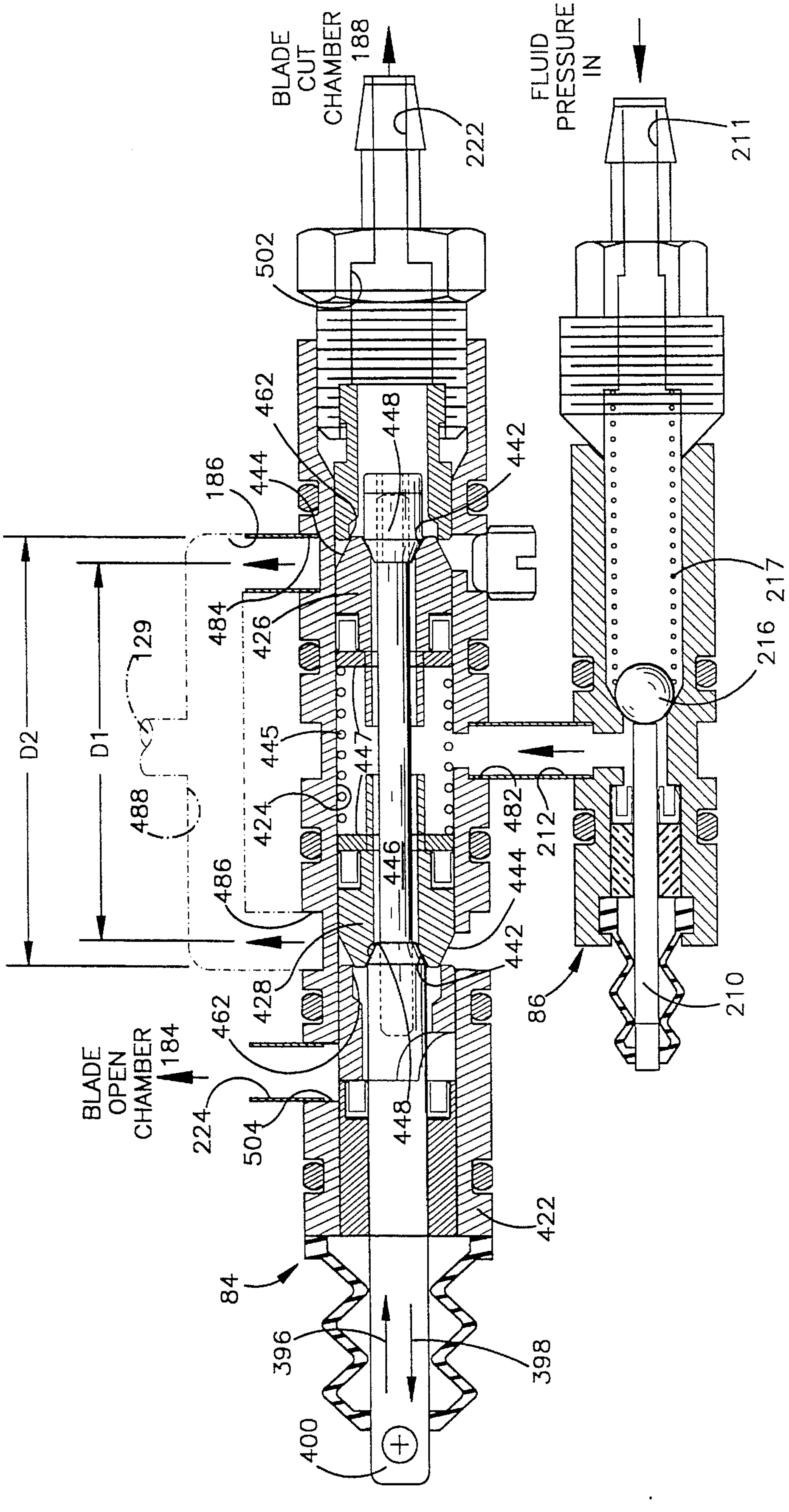
FIG. 16 is an enlarged longitudinal cross-sectional view of the servo control valve and safety valve of the shears.

The drive link 102 is a bell crank member having a generally L-shape. As illustrated in FIGS. 14 and 15, the drive link 102 is connected for pivotable movement about the pin 134. The pin 134 is received in the openings of the frame 62 and is located approximately along the longitudinal center line of the fixed blade 24. The drive link 102 pivots in the frame 62 at a location between the rod 166 of the actuator 82 and the slot 248 of the pivotable blade 22. A relatively longer leg 302 of the drive link 102 is connected with the rod 166 by a pin 306. The distance between the centers of the pins 134 and 306 is preferably 1.24 inches. The relatively shorter leg 304 of the drive link 102 is connected with the actuating portion 246 of the pivotable blade 22. The linkage between the leg 304 and the slot 248 of the pivotable blade 22 is through the pin 258, which is in sliding engagement with the blade. The distance between the centers of the pins 258 and 134 is preferably 0.83 inch.

The ratio of the distances of the longer leg portion 302 to the shorter leg portion 304 is in the range of 1.15:1 to 1.85:1 and is preferably about 1.50:1. This "leg ratio" being greater than 1.0 provides an increase in force transmitted to the actuating portion 246 of the blade 22 compared to the force applied to the drive link 102 by the rod 166. This force multiplication due to the mechanical advantage provided by the drive link 102 enables a relatively large cutting force to be applied between the blades 22, 24. Concurrently, a decrease in angular travel of the blade 22 compared between the angle of travel of the long leg 302 occurs as the blade is closing. The decreasing angular travel produces a proportionately increasing amount of force applied to blade 22, which compensates in part for the drop in cutting force that occurs as the cut point moves toward the end of the blade.

Pivotable movement of the drive link 102 about the pin 134 pivots the blade 22 about axis AA through engagement of the blade by the pin 258 in the slot 248. For example, when the rod 166 of actuator 88 is forced to move axially to the left, as viewed in FIG. 15, the longer leg portion 302 of the drive link 102 pivots clockwise about the pin 134 causing the leg portion 304 to follow with clockwise pivotal movement about the pin. However, the arcuate movement at pin 258 is less than the arcuate movement at pin 306. This results because the distance from the centers of pin 134 to pin 258 is less than the distance from the centers of pin 134 to the center of pin 306.

The finger loop handle 66 is received in the recess 120 in the frame 62. The finger loop handle 66 pivots relative to the support 118 about the same axis AA as the blade 24 pivots. The finger loop handle 66 pivots about 20° to 25° relative to the frame 62 between the fully open position illustrated in FIG. 2, and the fully closed position illustrated in FIG. 1, or about half of the arcuate movement of the pivotable blade 22. The finger loop handle 66 includes a finger handle portion 322 for receiving therein up to four fingers of an operator's hand located opposite the thumb. The finger handle portion 322 is preferably continuous and closed which allows an operator's fingers to move the loop handle 66 in both directions for pivotable movement about the support 118, and also acts as a guard for the fingers.

A pivot portion 320 of the loop handle 66 surrounds the support 118 and is narrower than the width of the finger handle portion 322. The return spring 226 engages an end surface 326 on pivot portion 320 of the finger loop handle 66 to continuously bias the finger loop handle portion 322 towards the fully open position, as illustrated in FIG. 2.

A blade link 340 (FIG. 14) forms a part of the feedback linkage 104. The blade link 340 is also received on the support member 118 at opening 338 for pivotable movement about the axis AA. The blade link 340 is located in the recess 120 of the frame 62. The blade link 340 is axially offset from the pivot portion 320 of the loop handle 66.

The blade link 340 detects movement of the pivotable blade 22 and communicates that movement to a difference link 362 in the feedback linkage 104. The blade link 340 detects movement of the pivotable blade 22 at one end by engagement with the pin 258 in the drive link 102 that extends through a slot 342 of the blade link. The movement of the blade link 340 is transmitted to the difference link 362 through a pin 344 at a location relative to the opening 338 which is generally opposite the slot 342. The distance from the axis AA at which the pin 258 engages a surface defining the slot 342 of the blade link 340 is in the range of 0.73 to 0.96 inch. The distance to the center of the pin 344 from the axis AA is 0.46 inch. The pin 258, thus, moves through an arcuate distance greater than the arcuate distance that the pin 344 moves and is proportionately greater by a ratio in the range of about 1.5:1 to about 2.1:1.

The difference link 362 is connected between the pin 344 of the blade link 340 and a pin 366 on the finger loop handle 66. The difference link 362 forms part of the feedback linkage 104 and communicates a difference between pivotal movement of the blade 24 and the pivotal movement of the finger loop handle 66 to the servo control valve 84.

The difference link 362 is a generally L-shaped member formed by legs 374, 376 meeting at an apex. A pin 382 in an aperture 370 at the apex communicates movement of the apex to an actuator link 386 of the servo valve 84. The difference link 362 includes a slot 364 in leg 374 for receiving the pin 344 of the blade link 340 and an opening 368 in the leg 376 for receiving the pin 366 of the finger loop handle 66. The distance from the center of the opening 368 in one leg 376 of the difference link 362 to the center of the aperture 370 at the apex is shorter than the distance between the center of the aperture 370 to the average center of the slot 364 in the other leg 374. The difference link 362 has a ratio of the length of leg 374 to the length of leg 376 in the range of about 1.3:1 to 1.7:1. Thus, a relatively larger proportion of movement of the finger loop handle 66 is communicated to the servo control valve 84 than the proportion of movement of the pivotable blade 22.

Figure 18:
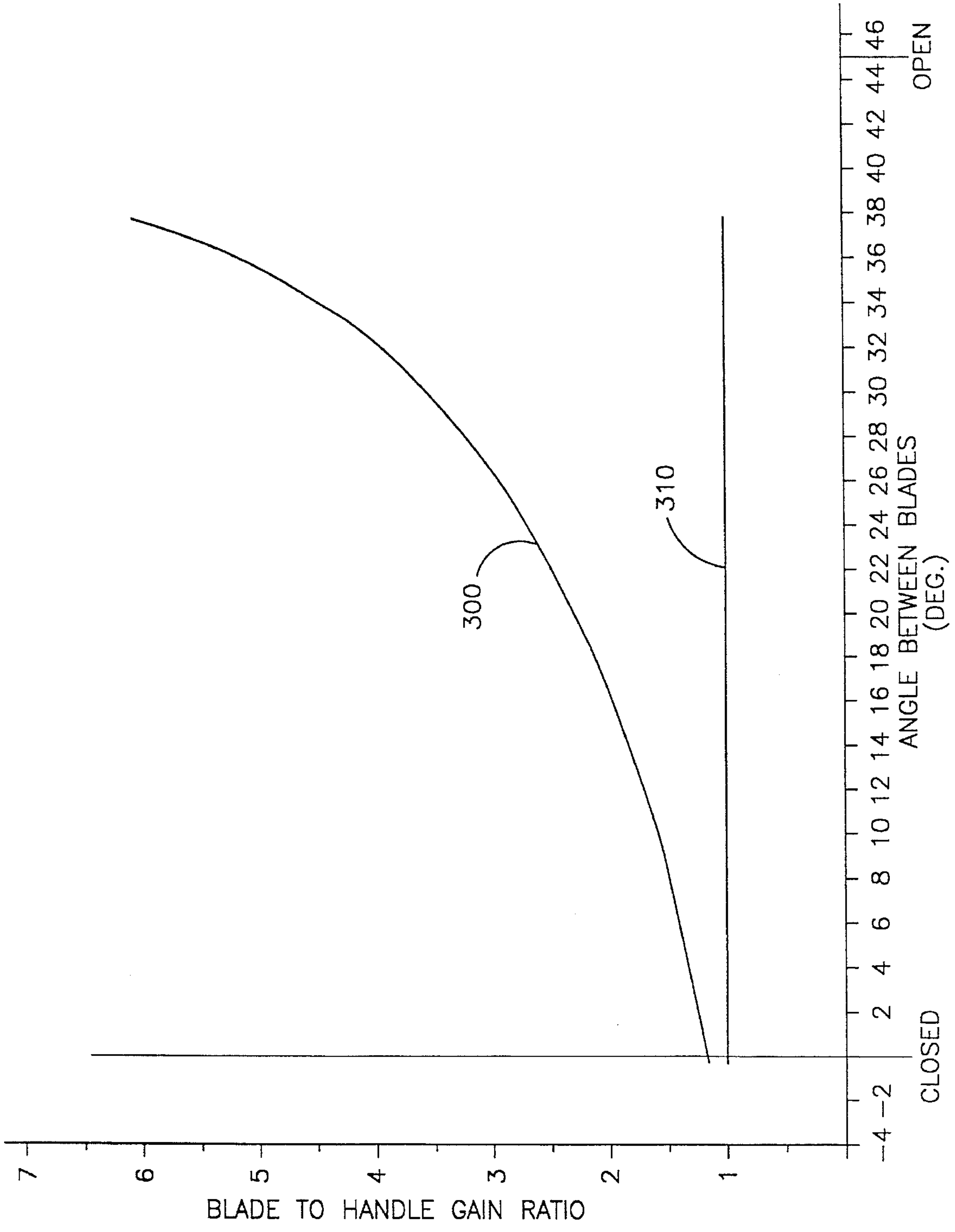
FIG. 18 is a graph representing the ratio of the change in blade angle relative to the change in handle angle as a function of the relative angle between the blades.

The ratio of the leg 374 length to the leg 376 length of the difference link 362 results in a decrease in speed of movement as the blade 22 nears the closed position. This decrease in speed of movement of the blade 22 relative to the movement of the handle 66 is represented by curve 300 in FIG. 18 as "blade gain ratio." The blade gain ratio is plotted as a function of the angle between the blades 22,24. This noticeable gain ratio means that the change in angle between the blades 22, 24, to the change in angle between the handle 66 and the frame 62, decreases from over a 6:1 ratio at the fully open position to about 1:1 at the closed position. This is compared to the constant 1:1 ratio of conventional scissors in curve 310. The variable "blade gain ratio" is particularly advantageous for controlling cutting with a relatively slow closure rate near the fully closed blade position.

A pin 382 received in the aperture 370 at the apex of the difference link 362 extends into an opening 384 of the actuator link 386. The actuator link 386 includes an opening 388 at an end opposite to the opening 384. The opening 388 receives a pin 390 that is connected with a stem 400 in the servo control valve 84.

The actuator link 386 transmits motion of the difference link 362 to the stem 400 in the servo control valve 84. Because the difference link 362 reflects the difference in pivotal movement between the loop handle 66 and the pivotable blade 22 and moves the actuator link 386 and, hence, the stem 400 in the servo control valve 84, it provides a difference feedback signal to the servo control valve.

For example, the finger loop handle 66 is pivoted by an operator from the open position to the closed position nearer the frame 62 when the blades 22, 24 are in the fully open position, as illustrated in FIG. 2. The difference link 362 then pivots clockwise about the pin 344 by the pin 366 in the finger loop handle 66. The pin 382 forces the actuator link 386 to move the stem 400 axially inward within the servo control valve 84, in a direction that causes the pivotable blade 22 to move towards the closed position. There is a time lag before the piston 168 and the power rod 166 of the actuator 88 force the pivotable blade 22 to pivot towards the closed position that is illustrated in FIG. 1. During this time lag, until the blade 22 begins to pivot, the difference link 362 has pivoted only about the pin 344 supported in the blade link 340. Once the blade 22 begins to pivot, the position of the difference link 362 then reflects a tendency to pivot about pin 366. If the finger loop handle 66 continues to move ahead of the blade 22 movement, then movement of pins 366, 344 tend to cancel their influence on the difference link 362 and produce an apparent rotation about pin 382. The actuator link 386 essentially maintains its position and the blade 22 continues to pivot. If the blade 22 movement tends to catch up to the finger loop handle 66 movement, the difference link 362 pivots about pin 366, causing the actuator link 386 to move the stem 400 in a direction axially out of the valve 84, reducing the flow of fluid to the actuator 88 and, hence, showing or stopping pivoting of the blade 22.

Figure 17B:
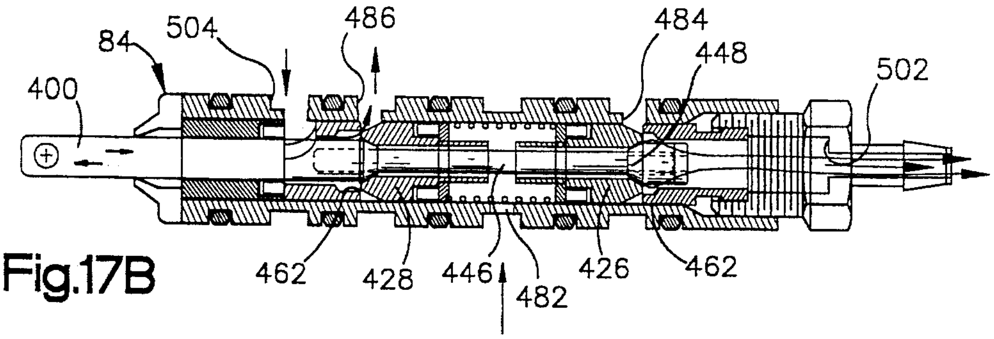
Figure 17C:
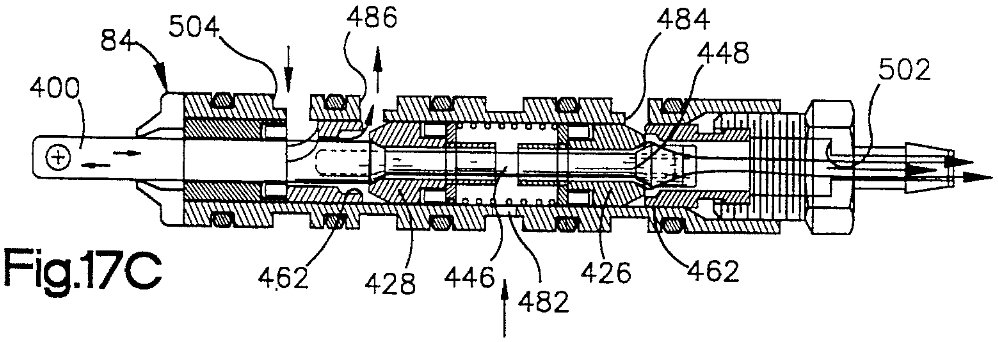
Figure 17D:
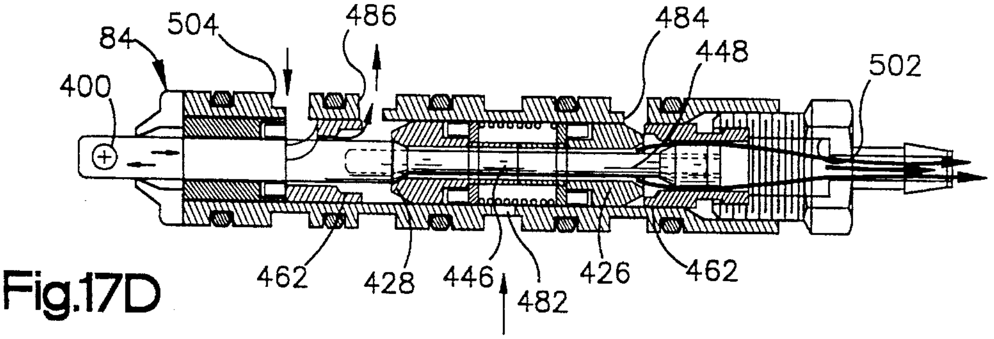

Thus, the servo control valve 84 is actuated from the position illustrated in FIG. 17A through the position illustrated in FIGS. 17B through 17D by movement of the difference link 362. The travel limit of the stem 400 within the servo control valve 84 is illustrated in FIG. 17D. During the axial inward movement or cut signal, indicated by the arrow 396 (FIG. 16), of the stem 400 within the servo control valve 84, fluid is directed to the line 222 to the port 190 and into the "cut" chamber 188 in the actuator 88. This forces the piston 168 and its associated rod 166 to move in a cut direction and move the blade 22 from the open position towards the closed position. The rod 166 forces the drive link 102 to pivot the pivotable blade 22 toward the fixed blade 24 with a cutting action.

During this pivotable movement of the pivotable blade 22 towards the fixed blade 22, the blade link 340 communicates the movement of the pivotable blade to the difference link 362. The difference link 362 pivots about the pin 366 in a clockwise direction which causes the actuator link 386 to pull the stem 400 in a direction axially outward of the servo control valve 84. The pivotable blade 22 tries to catch up to the desired position indicated by the position of the finger loop handle 66 relative to the frame 62. The difference link 362 continues to pivot clockwise about the pin 366. the pivotable blade 22 does eventually catch up to the desired blade position indicated by the position of the loop handle 66 relative to the frame 62.

The difference link 362 detects that the position of the pivotable blade 22 relative to the blade 24 or frame 62 has caught up to the desired position indicated by the position of the loop handle 66 relative to the frame 62. The difference link 362 stops rotating about either pin 366 or 344. No motion is, thus, imparted to the actuator link 386 and the stem 400 is in a "neutral" position, illustrated in FIG. 17G, which does not cause any further pivoting of the blade 22 from the position it was in when the stem reached the neutral position. It will be apparent that from the position that the blade 22 stopped, it could thereafter be opened, closed or could remain stationary relative to the blade 24, as long as the blade 24 is between the fully open or fully closed positions when it stopped moving.

To move the blade 22 towards the open position of FIG. 2, the reverse takes place. The loop handle 66 is pivoted away from the frame 62 towards the fully open position illustrated in FIG. 2. This forces the pin 366 to pivot the difference link 362 at opening 368 counterclockwise about the pin 344. This pivoting motion of the difference link 362 imparts a force to the actuator link 386 that pulls the control stem 400 in a direction axially outward of the servo control valve 84 towards the position illustrated in FIG. 17H.

Such axially outward motion causes fluid to flow through line 224 to port 186 and into open chamber 184. Fluid pressure forces the piston 168 and rod 166 to move in a direction towards the mounting portion end 164 of the actuator 88. This axially inward movement of the rod 166 in the actuator 88 causes the drive link 102 to pivot in a clockwise direction about the pin 134 which causes the actuating portion 246 of the blade 22 to pivot about the axis AA in a clockwise direction. Pivoting of the drive link 102 in a clockwise direction causes the blade 22 to move from the closed position illustrated in FIG. 1 relative to the fixed blade 24 toward the open position illustrated in FIG. 2.

Figure 17E:
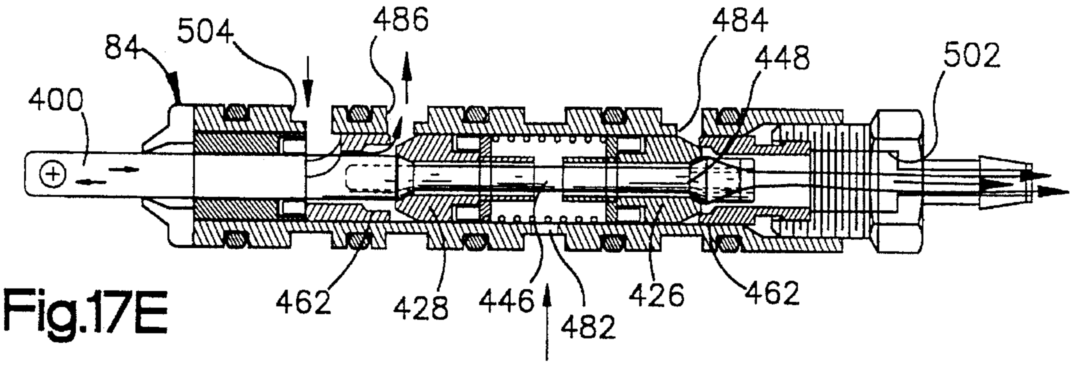
Figure 17F:
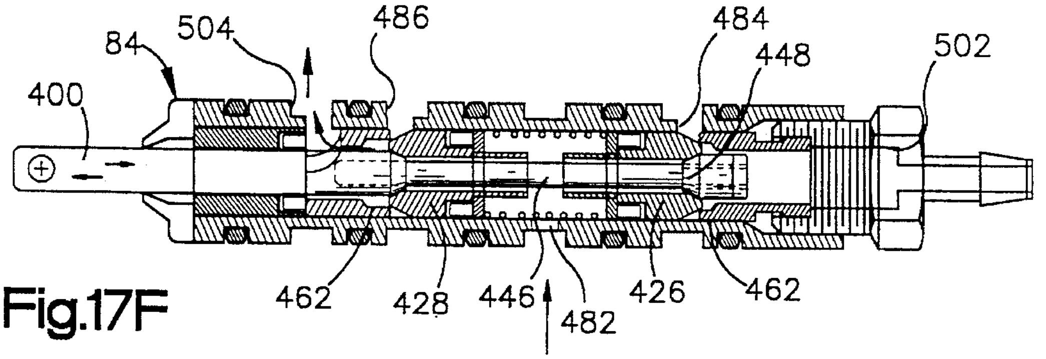
Figure 17G:
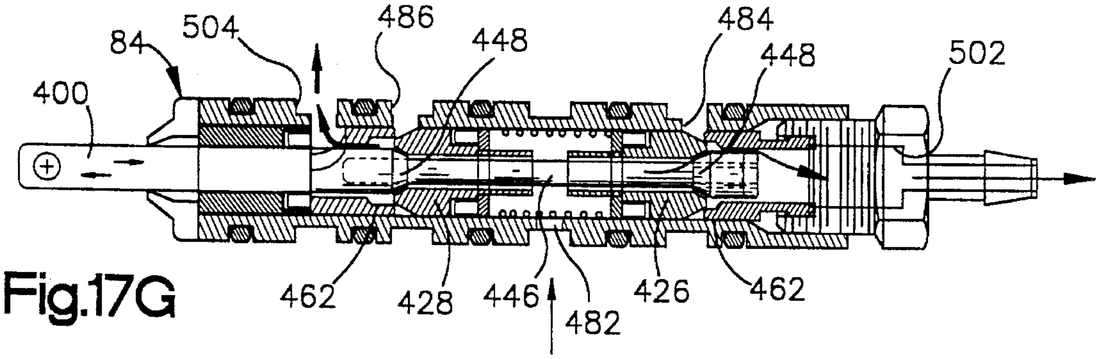
Figure 17H:
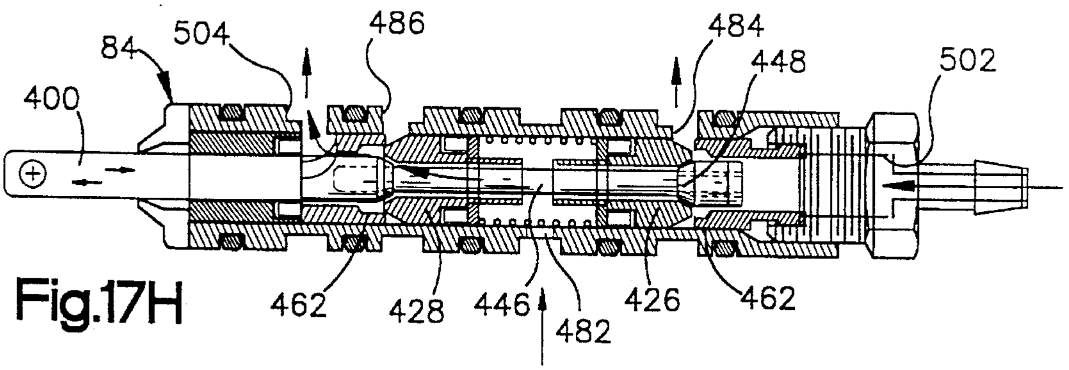

Thus, the stem 400 moves from the position in the servo control valve 84 illustrated in FIG. 17G progressively to the position illustrated in FIG. 17H. The position illustrated in FIG. 17H is a reversing travel position or a position in which opening motion of the blade 22 will occur.

The servo control valve 84 (FIG. 16) controls fluid flow to the actuator 88. The servo control valve 84 includes a valve body 422 that defines an elongated chamber 424. Two oppositely facing pistons 426, 428 are independently movable longitudinally within the chamber 424 of the valve body 422. Each piston 426, 428 has an inner annular first valve seat 442 and an outer annular first obturating surface 444. A reciprocable valve stem 446 extends through and is at least partially surrounded by the pistons 426, 428. The valve stem 446 is connected to and is part of stem 400. Each of the pistons 426, 428 includes a surface 447 for transmitting force to the piston in a direction away from the other. The servo control valve 84 may optionally include a compression spring 445 between and acting concurrently against the force transmitting surface 447 associated with each piston 426, 428.

Two oppositely facing spaced annular second obturating surfaces 448 are carried by the valve stem 446 at opposite ends a fixed distance D1 apart. The pistons 426, 428 are located between the two second obturating surfaces 448 and are reciprocable relative to the valve stem 446. Each of the second obturating surfaces 448 are arranged to cooperate with one of the inner annular first valve seats 442 to control fluid flow along the valve stem 446 from the fluid inlet 212 intermediate the pistons 426, 428.

Two annular second valve seats 462 are fixed in the valve body 422. Each of the second valve seats 462 is located to coact with the outer annular first obturating surfaces 444 of one of the pistons 426, 428. This contact limits the longitudinal movement of the pistons 426, 428 in a direction away from each other and controls fluid flow past the outer annular first obturating surfaces 444.

A first port 482 to the chamber 424 is located between the pistons 426, 428 and serves as a fluid inlet to the chamber. A second port 484 and a third port 486 are for separate fluid communication with the chambers 184, 188 through lines 222, 224, respectively. The second port 484 and the third port 486 communicate independently with a common passage 488 in the frame 62 for exhausting fluid from the servo control valve 84 and shears 20 at exhaust port 129. The second port 484 and third port 486 are associated with a respective one of the second valve seats 462 for exhausting fluid from the chambers 184, 188. The second port 484 is closable by the right piston 426, as viewed in FIG. 16, to block fluid flow from the chamber 188 to the common passage 488. The third port 486 is closable by the left piston 428, as viewed in FIG. 16, to block fluid flow from the chamber 184 to the common passage 488.

A fourth port 502 and a fifth port 504 to the chamber 424 are each located longitudinally outward of the pistons 426, 428 and their associated second valve seats 462. The fourth port 502 is for supplying fluid to and receiving fluid from the "cut" chamber 188 of the fluid actuator 88. The fifth port 504 is for supplying fluid to and receiving fluid from the "open" chamber 184 of the fluid actuator 88. The distance D1 between the two second obturating surfaces 448 and the distance D2 between the two annular second valve seats 462 are such that the pistons 426, 428 permit limited fluid flow or a "controlled leakage" from the first port 482 equally to the fourth port 502 and fifth port 504 when the valve stem 446 is in the "neutral" or first position. The distances D1 and D2 are also such that the pistons 426, 428 allow preferential fluid flow through the fourth port 502 or the fifth port 504 and only one of the second port 484 and the third port 486 when the valve stem 446 is in a position other than the first position. It should be apparent that the distances D1 and D2 may be established so that the pistons 426, 428 completely block fluid flow to the fourth port 502 and the fifth port 504 when the valve stem 446 is in the first position.

Operation

To operate the shears 20 embodying the present invention the following procedure is followed. Assuming that the operator desires to cut something, such as cloth, paper, cardboard or meat, the shears 20 will normally start with the blades 22, 24 in the fully open relative position illustrated in FIG. 2. To move the blades 22, 24 from the open position illustrated in FIG. 2 to the closed ending position illustrated in FIG. 1, the operator first inserts a thumb into the thumb opening 142 in the thumb handle portion 64 in the frame 62. As the operator's thumb is fitted in the opening 64, the safety button 206 is depressed to permit pressurized fluid to pass through the safety valve 86 and into the servo control valve 84. At least one of the operator's fingers is received in the finger handle portion 322 in the finger loop handle 66. The operator then manually pivots the finger loop handle 66 from the open position illustrated in FIG. 2 towards the closed position illustrated in FIG. 1. The operator may stop the pivoting movement of the finger loop handle 66 anywhere between the open and closed position or continue to the travel limit or closed position, illustrated in FIG. 1.

This starting of relative pivoting action of the finger loop handle 66 forces the difference link 362 to pivot about the pin 344 in a clockwise direction (FIG. 14) and forces the actuator link 382 to move the stem 400 axially inward of the servo control valve 84 from the position illustrated in FIG. 17A to the position illustrated in FIG. 17B. This motion of the stem 400 allows fluid to flow to "cut" chamber 188 of the actuator 88 through port 502 which moves the piston 168 in a direction to move the rod 166 axially outward of the actuator. That is, the conical surface 448 disengages from the valve seat 442 on piston 426 to communicate the first port 482 with the fourth port 502 to allow fluid flow to the "cut" chamber 188. Concurrently, the left port 504 fluidly communicates with the third port 486 to exhaust fluid from the "open" chamber 184. The second port 484 is maintained blocked by piston 426. Thus, the drive link 102 pivots counterclockwise about the pin 134 and drives the pivotable blade 22 towards the fixed blade 24.

Upon further pivoting movement of the finger loop handle 66 relative to the frame 62, but before the blade 24 catches up to the position indicated by the finger loop handle, the difference link 362 pivots further about the pin 344 in a clockwise direction. This causes the stem 400 to be moved farther inward of the servo control valve 84 from the position illustrated in FIG. 17B to the position illustrated in FIG. 17C. The conical surface 448 is spaced further from the valve seat 442 on piston 426 and the piston 428 is spaced further from annular valve seat 462, than the position illustrated in FIG. 17B. This allows relatively more fluid flow between the first port 482 and the fourth port 502 and between the fifth port 504 and third port 486. The greater fluid flow to the cut chamber 188 of the actuator 88 forces the piston 168 and rod 166 to pivot the blade 22 even faster towards the closed position.

The maximum cut position of the servo control valve 84 is illustrated in FIG. 17D. This position is reached by pivoting the finger loop handle 66 quickly towards the frame 62 while cutting a tough object. The difference link 362 pivots clockwise about the pin 344 to move the stem 400 to its axial inward limit. The conical surface 448 is spaced a maximum distance from the seat 442 of the piston 426 and the piston is held against the annular valve seat 462 by fluid pressure in the chamber 424. Concurrently, the surface 444 of the piston 428 is spaced from the annular vale seat 462. This position permits the maximum fluid flow between the first port 482 and the fourth port 502 and between the fifth port 504 and third port 486. This flow moves the blade 22 quickly to cut the tough object.

When the pivoted position of the blade 22 begins to catch up with the position indicated by the finger loop handle 66, the difference link 362 begins to pivot about the pin 366 due to movement of the pivotable blade relative to the position of the finger loop handle. The difference link 362 causes the stem 400 to move axially outward of the servo control valve 84 to the position illustrated in FIG. 17E from the position illustrated in FIGS. 17C or 17D. The conical surface 448 moves closer to the piston 426 and the piston 428 moves closer to the valve seat 462. Fluid flow from the first port 482 to the fourth port 502 and from the fifth port 504 to third port 486 continues but at a reduced rate. The blade 22 still is forced to close but at a slower closure rate.

The cutting action of the blades 22, 24 can be stopped at any time by stopping the finger loop handle 66 at any position between its travel limits. The blade 22 will then stop at a position corresponding to the relative position of the finger loop handle 66. This will cause the difference link 362 to maintain a neutral position in which fluid pressure, applied to either chamber 184, 188 of the actuator 88, is not increased.

To open the shears 20 from the position illustrated in FIG. 1 towards the position illustrated in FIG. 2, the operator manually pivots the loop handle 66 away from the frame 62. The difference link 362 pivots counterclockwise about the pin 344 to force the actuator link 386 to pull the stem 400 outwardly of servo control valve 84. This action provides fluid flow from the control valve to the open chamber 184 in the actuator 88. Fluid pressure in chamber 184 forces the power rod 166 to move axially inward into the actuator 88 and causes the drive link 102 to pivot clockwise about the pin 134. This imparts a force to pivot the blade 22 counterclockwise about the axis AA in a direction towards the open position relative to the fixed blade 24.

When the difference link 362 pivots counterclockwise about the pin 344, the stem 400 is caused to move axially outward of the servo control valve 84 from the position illustrated in FIG. 17E to the position illustrated in FIG. 17F. The right conical surface 448 engages the piston 426 to block fluid flow to the "cut" chamber 188 through the fourth port 502. The second port 484 remains blocked by the piston 426. The left conical surface 448 disengages the piston 428 to allow fluid flow to the "open" chamber 184 through the fifth port 504. The third port 486 is closed by the piston 428. Pressure in the chambers 184 and 188 equalizes on either side of the piston 168 to stop movement of the rod 166 and blade 22.

The difference link 362 and stem 400 are returned to their respective neutral positions. The stem 400 is centered in the servo control valve 84 in the first position again, as illustrated in FIG. 17G which is the same as FIG. 17A. Equal fluid flow, or no fluid flow, occurs from the first port 482 to the fourth port 502 and fifth port 504. Exhaust to the second and third ports 484, 486 is permitted if needed.

If the blade 22, during a cutting action, overshoots the desired position indicated by the finger loop handle 66, the servo control valve 84 can compensate, as illustrated in FIG. 17H. The difference link 362 pivots clockwise about the pin 366 due to the excessive movement of the blade 22. The stem 400 is moved axially outward of the servo control valve 84 to the position illustrated in FIG. 17H. The piston 426 is spaced from the annular valve seat 462 to permit fluid flow from the "cut" chamber 188 through the fourth port 502 to exhaust through the second port 484. The piston 426 engages conical surface 448 to block fluid flow from the first port 482. At the same time, the piston 428 engages the annular valve seat 462 but is spaced from the left conical surface 448. This blocks fluid flow to exhaust through the third port 486 while permitting fluid flow from the inlet first port 482 to the open chamber 184 through the fifth port 504. This flow causes the piston 168 and rod 166 to move inward of the actuator 88 to stop and reverse the cutting action of the pivotable blade 22.

Other uses than the power operated shears are also contemplated for the tool of the present invention. For example, the tool can be used, without limitation, as power operated pliers, crimpers, clamp, caulking gun or other tool in which it is desirable to have reversible, controllable, force multiplied and/or slower speed at the end of relative movement between members.

Having described a preferred embodiment of the invention, I claim:

1. A servo valve for controlling fluid flow to a fluid actuator, said valve comprising a valve body, an elongated chamber defined by the valve body, two oppositely facing annular pistons independently movable longitudinally within the body chamber, each piston having an inner annular first valve seat and an outer annular first obturating surface, a reciprocable valve stem surrounded by said pistons, two oppositely facing spaced annular second obturating surfaces carried by the stem a fixed distance apart, with the pistons located between the two second obturating surfaces and reciprocable on the valve stem, each of the second obturating surfaces arranged to cooperate with one of the inner annular first valve seats to control fluid flow along the valve stem from a fluid inlet intermediate the pistons, two annular second valve seats fixed in the valve body, each located to coact with the outer annular first obturating surfaces of one of the two pistons to limit the longitudinal movement of the pistons away from each other and to control fluid flow past the outer annular first obturating surfaces, said pistons each including a surface for transmitting force to the piston in a direction away from the other, a first port to the chamber located between the pistons and serving as a fluid inlet to the chamber, second and third ports to the chamber each associated with one of said second valve seats for exhausting fluid from the chamber and closable by the pistons, and fourth and fifth ports to the chamber each located longitudinally outward of the pistons and the second valve seats for supplying fluid to and receiving fluid from a fluid actuator, the distance between the two second obturating surfaces and the distance between the two annular second valve seats allowing the pistons to provide restricted flow from the first port equally to the fourth and fifth ports when the valve stem is in a first position, and allowing preferential flow through the fourth or fifth port and only one of the second and third ports when in other than the first position.

2. A servo valve as set forth in claim 1 including a compression spring between and acting concurrently against said force transmitting surface of each piston.

3. A servo valve for controlling fluid flow to a fluid actuator, said servo valve comprising a valve body, an elongated chamber defined by the valve body, two oppositely facing annular pistons independently movable longitudinally within the body, each piston having an inner annular first valve seat and an outer annular first obturating surface, a reciprocable valve stem surrounded by the pistons, two oppositely facing spaced annular second obturating surfaces carried by the valve stem a fixed distance apart, the pistons located between the two second obturating surfaces and reciprocable on the valve stem, each of the second obturating surfaces arranged to cooperate with one of the inner annular first valve seats to control fluid flow along the valve stem from a fluid inlet intermediate the pistons, two annular second valve seats fixed in the valve body, each located to coact with the outer annular first obturating surfaces of one of the two pistons to limit the longitudinal movement of the pistons away from each other and to control fluid flow past the outer annular first obturating surfaces, said pistons each including a surface for transmitting force to the piston in a direction away from the other, a first port to the chamber located between the pistons and serving as a fluid inlet to the chamber, second and third ports to the chamber each associated with one of said second valve seats for exhausting fluid from the chamber and closable by the pistons, and fourth and fifth ports to the chamber each located longitudinally outward of the pistons and the second valve seats for supplying fluid to and receiving fluid from a fluid actuator, the distance between the two second obturating surfaces and the distance between the two annular second valve seats allowing the pistons to prevent flow from the first port to any of the other ports when the valve stem is in a first position, and allowing flow through the fourth and fifth ports and only one of the second and third ports when in other than the first position.

4. A servo valve as set forth in claim 3 further including a compression spring between and acting concurrently against said force transmitting surface of each piston.

5. A servo valve sized to fit in a hand held power operated tool and for controlling fluid flow to a fluid actuator of the tool, said servo valve comprising a valve body defining an elongated chamber, two oppositely facing annular pistons independently movable longitudinally within the chamber, each piston having an inner annular first valve seat and an outer annular first obturating surface, a reciprocable valve stem surrounded by said pistons, two oppositely facing spaced annular second obturating surfaces carried by the stem a fixed distance apart, the pistons located between the two second obturating surfaces and reciprocable on the valve stem, each of the second obturating surfaces arranged to cooperate with one of the inner annular first valve seats to control fluid flow along the valve stem from a fluid inlet intermediate the pistons, two annular second valve seats fixed in the valve body, each of the second valve seats located to coact with the outer annular first obturating surfaces of one of the two pistons to limit the longitudinal movement of the pistons away from each other and to control fluid flow past the outer annular first obturating surfaces, said pistons each including a surface for transmitting force to the piston in a direction away from the other, a first port to the chamber located between the pistons and serving as the fluid inlet to the chamber, second and third ports to the chamber each associated with one of said second valve seats for exhausting fluid from the chamber and closable by the pistons, and fourth and fifth ports to the chamber each located longitudinally outward of the pistons and the second valve seats for supplying fluid to and receiving fluid from a fluid actuator, the distance between the two second obturating surfaces and the distance between the two annular second valve seats allowing the pistons to provide restricted flow from the first port equally to the fourth and fifth ports when the valve stem is in a first position, and allowing preferential flow through the fourth or fifth port and only one of the second and third ports when in other than the first position.

6. A servo valve as set forth in claim 5 including a compression spring between and acting concurrently against said force transmitting surface of each piston.

* * * * *